(12) United States Patent
Zakoji et al.

(10) Patent No.: US 7,585,077 B2
(45) Date of Patent: Sep. 8, 2009

(54) OPTICAL APPARATUS AND PROJECTOR

(75) Inventors: Makoto Zakoji, Shiojiri (JP); Satoshi Kinoshita, Matsumoto (JP); Motoyuki Fujimori, Suwa (JP); Yoshiyuki Yanagisawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 725 days.

(21) Appl. No.: 11/336,987

(22) Filed: Jan. 23, 2006

(65) Prior Publication Data

US 2007/0051057 A1    Mar. 8, 2007

(30) Foreign Application Priority Data

Mar. 1, 2005    (JP) .............................. 2005-055628

(51) Int. Cl.
  G03B 21/26    (2006.01)
  G03B 21/22    (2006.01)
  G03B 9/08     (2006.01)
  H04N 5/74     (2006.01)
  G02F 1/1333   (2006.01)

(52) U.S. Cl. .................... 353/54; 353/119; 352/202; 348/748; 349/161

(58) Field of Classification Search .................. 353/54, 353/52, 119, 122; 352/202; 348/748; 349/161
See application file for complete search history.

(56) References Cited

U.S. PATENT DOCUMENTS

| 5,868,485 A | 2/1999 | Fujimori et al. |
| 6,053,616 A | 4/2000 | Fujimori et al. |
| RE37,836 E | 9/2002 | Fujimori et al. |
| RE38,306 E | 11/2003 | Fujimori et al. |
| 2005/0220156 A1 * | 10/2005 | Kitabayashi .................. 372/35 |
| 2006/0198150 A1 * | 9/2006 | Kinoshita et al. ............ 362/373 |

FOREIGN PATENT DOCUMENTS

| CN | 1204394 A | 1/1999 |
| JP | A 60-000294 | 1/1985 |
| JP | A 01-159684 | 6/1989 |
| JP | A 09-096787 | 4/1997 |
| JP | A 2002-156195 | 5/2002 |
| JP | A 2003-215708 | 7/2003 |
| JP | A 2003-262917 | 9/2003 |
| JP | A 2003-337219 | 11/2003 |
| JP | A 2004-117580 | 4/2004 |
| JP | A-2004-126255 | 4/2004 |

* cited by examiner

*Primary Examiner*—Diane I Lee
*Assistant Examiner*—Magda Cruz
(74) *Attorney, Agent, or Firm*—Oliff & Berridge, PLC

(57) ABSTRACT

A projector includes: a light source unit; an optical apparatus including, an optical device, a holding frame for holding a periphery of the optical device, a cooling tube that is provided in the holding frame along the periphery of the optical device and in which a cooling fluid flows, wherein a gap between the holding frame and the cooling tube is filled with a thermally conductive material; a cooling unit for circulating the cooling fluid in the optical apparatus; and a projection optical apparatus for enlarging and projecting an optical image formed by means of the optical apparatus.

13 Claims, 25 Drawing Sheets

F I G. 1
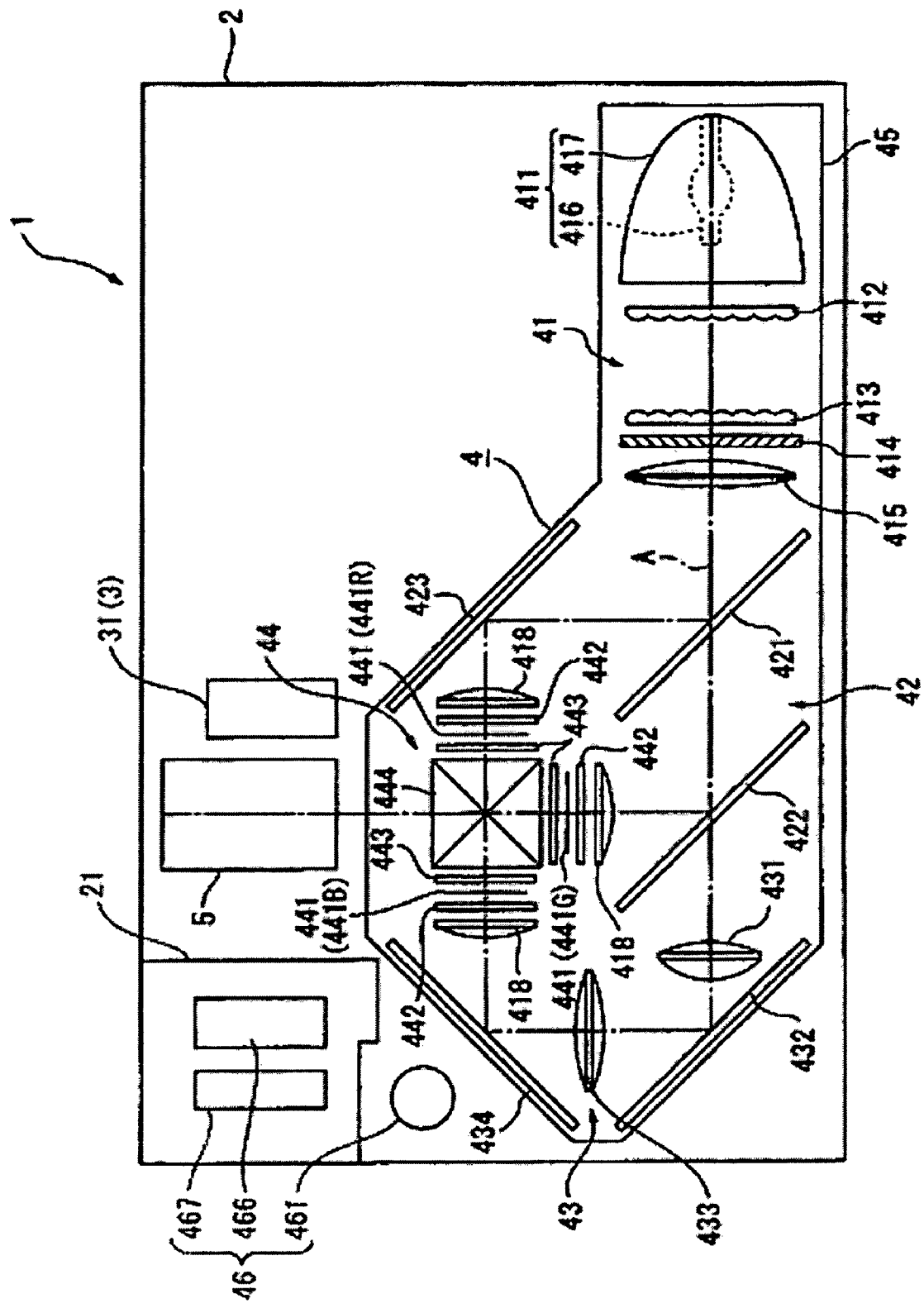

F I G. 4
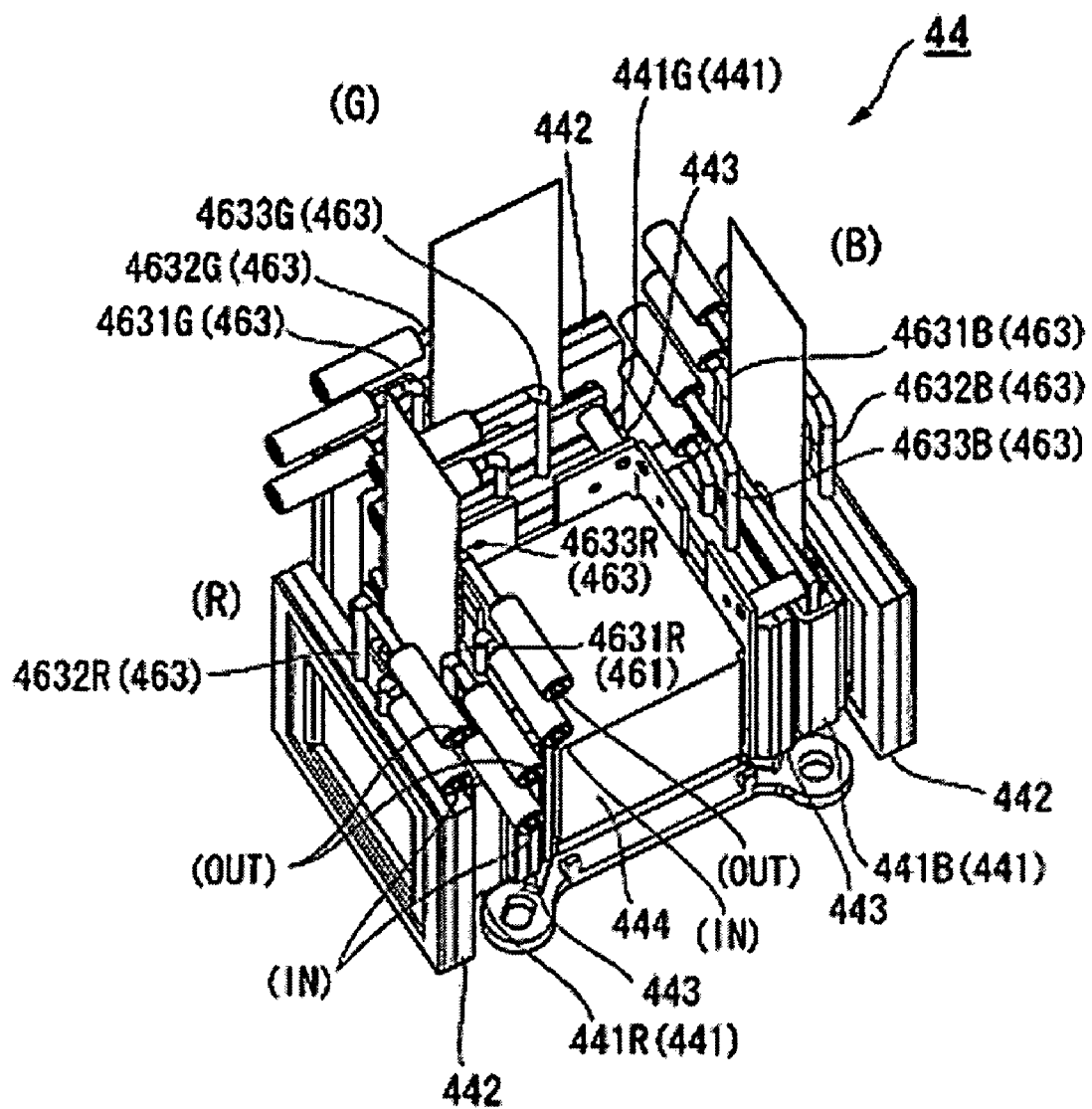

B-B

C-C

OPTICAL APPARATUS AND PROJECTOR

BACKGROUND OF THE INVENTION

1. Technical Field

The present invention relates to an optical apparatus and a projector.

2. Related Art

There is a projector known which comprises an optical modulation device for modulating luminous flux from a light source in accordance with image information and a projection optical apparatus for magnifying and projecting the luminous flux modulated by means of the optical modulation device.

As an optical modulation device, used is an active matrix driving type liquid crystal panel in which liquid crystal is air-tightly contained between a pair of substrates, for example. Typically, an incident side polarizing plate and an exit side polarizing plate, which have a predetermined polarizing axis, for transmitting luminous flux are respectively provided on an incident side and an exit side of luminous flux of a liquid crystal panel.

In a projector comprising the above-mentioned liquid crystal panel, when luminous flux is emitted from a light source, absorption of light by a liquid crystal layer, a black matrix, various kinds of wiring and the like easily causes increase in temperature of the liquid crystal panel and generation of heat of a polarizing plate.

In view of the above, proposed is a technique that a transmission type cooling chamber is provided as a liquid coolant layer between a liquid crystal panel and a polarizing plate and a cooling fluid is poured into the cooling chamber for the purpose of keeping down increase in temperature of an optical modulation device or a polarizing plate (refer to JP-A-H01-159684, for example).

As a cooling structure using a cooling fluid, known is one comprising a cooling plate having a structure that a metal pipe is provided as a coolant flow path between inner surfaces of a pair of oppositely assembled metal plates. Such a cooling plate is manufactured by forming a pipe housing groove larger than the metal pipe in at least one of the pair of metal plates to assemble the metal pipe and the pair of metal plates into one body. In a process of manufacturing the above, the metal pipe is supplied with a pressurized fluid after the above assembly and a diameter of the metal pipe is enlarged so that the metal pipe would be in close contact with the pipe housing groove (refer to JP-A-2002-156195, for example).

In the technique of pouring a cooling fluid between a liquid crystal panel and a polarizing plate, luminous flux for forming an image passes through the cooling fluid. Accordingly, an optical image formed by means of the liquid panel includes an image of a bubble or dust contained in the cooling fluid or a blur of the optical image occurs in accordance with distribution of temperature of the cooling fluid. This is likely to cause deterioration in quality of an image. Further, in the case of deterioration of the cooling fluid, for example, transmittance of luminous flux is deteriorated, and as a result, a fall in illuminance or deterioration in color-reproducibility of the optical image formed by means of a liquid crystal panel is caused.

In the process of manufacturing a cooling plate having a structure that a metal pipe is provided as a coolant flow path between inner surfaces of a pair of oppositely assembled metal plates, the pipe housing groove is formed into a reversely tapered shape with respect to a connecting surface of the metal plate and an edge part (an undercut part) of the groove is dug into the metal pipe in enlarging a diameter of the metal pipe in order to connect the metal plate and the metal pipe.

This requires machining with a special cutting tool for forming the above-mentioned undercut part, and therefore, it is difficult to lower a cost.

Further, the process of enlarging a diameter of the metal pipe should be repeated in plural times for the purpose of making close connection between the housing groove and the metal pipe well. This requires considerable time.

Moreover, when a diameter of the metal pipe is small, enlargement of the diameter is difficult and unevenness in quantity of deformation of the pipe is easily caused. This causes a gap between the pipe and the housing groove, so that cooling performance of a cooling plate is easily deteriorated.

SUMMARY

An advantage of the invention is to provide an optical apparatus and a projector, which are capable of effectively keeping down a rise in temperature of an optical modulation device by means of a cooling fluid and which are favorable for lowering a cost and miniaturization.

A first optical apparatus according to the invention is an optical apparatus comprising: an optical device; a holding frame for holding a periphery of the optical device; and a cooling tube, which is provided in the holding frame along the periphery of the optical device and in which a cooling fluid flows, wherein a gap between the holding frame and the cooling tube is filled with a thermally conductive material.

In the first optical apparatus, the cooling tube is provided in the holding frame of the optical device. Accordingly, heat of the optical device is properly removed by means of the cooling fluid flowing in the cooling tube. That is to say, thermal connection between the optical device and the cooling tube via the holding frame allows heat exchange to be performed between the optical device and the cooling fluid in the cooling tube, so that the heat of the optical device is transferred to the cooling fluid in the cooling tube through the holding frame. Then, the transfer of the heat of the optical device to the cooling fluid allows the optical device to be cooled.

The cooling fluid does not transmit luminous flux for forming an image since the cooling tube is provided along the periphery of the optical device. This allows an image of a bubble, dust or the like in the cooling fluid to be prevented from being included in an optical image formed by means of the optical device or a blur of the optical image to be prevented from occurring in accordance with temperature distribution of the cooling fluid.

Further, in the optical apparatus, a path for the cooling fluid is formed from a tube (the cooling tube) on the periphery of the device. This allows a connection part for forming the path to be comparatively reduced. Accordingly, formed is a flow path, which has a small risk of leaking a fluid and which is even and smooth in a flowing direction, so that piping resistance is small.

Therefore, in accordance with the optical apparatus, a disadvantage in using a cooling fluid can be prevented from occurring while a rise in temperature of the optical modulation device can be effectively kept down.

In the structure that the cooling tube is provided in the holding frame of the optical modulation device, the holding frame functions as both of holding means and cooling means for the optical modulation device. Such a structure allows miniaturization to be easily achieved and is preferably applicable to a small-sized optical device.

Moreover, in the first optical apparatus, the plate member and the cooling tube are thermally connected directly at a place where the both contact with each other while the both are thermally connected indirectly through a thermally conductive material at a place where a gap is generated.

That is to say, in the first optical apparatus, the plate member can be thermally connected to the cooling tube without enlarging a diameter of the cooling tube. Omitting a process of enlarging the diameter of the cooling tube contributes to great shortening of time for manufacture and enables the optical apparatus to be preferably applied to the cooling tube having a small diameter.

Accordingly, the first optical apparatus is advantageous for reducing a cost and a size.

The thermal conductivity of the thermally conductive material is preferably 3 W/(m·K) or more, more particularly, 5 W/(m·K) or more. The thermally conductive material having thermal conductivity lower than 3 W/(m·K) is not preferable since heat of the plate member is difficult to be transferred to the cooling tube. When the thermal conductivity of the thermally conductive material is 5 W/(m·K) or more, heat of the plate member can be well transferred to the cooling tube.

In the first optical apparatus, the thermally conductive material can include at least one of a resin material in which a metal material is mixed, a resin material in which a carbon material is mixed and hot melt.

In this case, the thermally conductive material preferably has elasticity within a range of temperature in using the cooling plate.

When the thermally conductive material has elasticity, it can expand and contract in accordance with a change of a gap between the plate member and the cooling tube due to thermal deformation, so that thermal connection between the plate member and the cooling tube can be stably maintained.

In the first optical apparatus, it can be arranged that the holding frame have a structure that a pair of frame members is oppositely provided so as to sandwich the cooling tube therebetween, a groove for housing the cooling tube be formed in an opposing surface of at least one of the pair of frame members and the thermally conductive material be provided in a gap between the groove and the cooling tube and/or a gap between the pair of frame members.

In accordance with such a structure, the cooling tube can be comparatively easily provided in the holding frame.

In this case, an auxiliary groove for at least temporally housing the thermally conductive material may be arranged to be formed in an inner surface of the groove and/or in an opposing surface of at least one of the pair of frame members.

Such an auxiliary groove allows the quantity of the thermally conductive material, which is to be provided, to be properly adjusted in accordance with the volume of a gap between the plate member and the cooling tube, so that thermal connection between the plate member and the cooling tube can be stably maintained.

In the first optical apparatus, it can be arranged that the pair of frame members be connected by means of at least one of mechanical connection such as connection by means of a screw, adhesion, welding and insertion.

Using such a method allows the pair of plate members to be connected each other.

It may be possible to obtain at least a part of connection force between the pair of plate members by means of adhesion force of the thermally conductive material.

A second optical apparatus in accordance with the invention is an optical apparatus comprising: an optical device; a holding frame for holding a periphery of the optical device; and a cooling tube, which is provided in the holding frame along the periphery of the optical device and in which a cooling fluid flows, wherein the holding frame has a structure that a pair of frame members is oppositely provided so as to sandwich the cooling tube therebetween, a groove for housing the cooling tube is formed on each opposing surface of the pair of frame members and the cooling tube is provided on a first member of the pair of frame members while a second frame member is formed by molding around the cooling tube from a material having a melting point lower than that of the cooling tube.

In the second optical apparatus, the cooling tube is provided in the holding frame of the optical device, similarly to the case of the first optical apparatus. Accordingly, the cooling fluid flowing in the cooling tube properly removes heat of the optical device. That is to say, thermal connection between the optical device and the cooling tube through the holding frame allows heat exchange to be carried out between the optical device and the cooling fluid in the cooling tube, and then, the heat of the optical device is transferred to the cooling fluid in the cooling tube through the holding frame. Transferring the heat of the optical device to the cooling fluid allows the optical device to be cooled.

The cooling fluid does not transmit luminous flux for forming an image since the cooling tube is provided along the periphery of the optical device. This allows an image of a bubble, dust or the like in the cooling fluid to be prevented from being included in an optical image formed by means of the optical device or a blur of the optical image to be prevented from occurring in accordance with temperature distribution of the cooling fluid.

Further, in the optical apparatus, a path for the cooling fluid is formed from a tube (the cooling tube) on the periphery of the device. This allows a connection part for forming the path to be comparatively reduced. Accordingly, formed is a flow path, which has a small risk of leaking a fluid and which is even and smooth in a flowing direction, so that piping resistance is small.

Therefore, in accordance with the optical apparatus, a disadvantage in using a cooling fluid can be prevented from occurring while a rise in temperature of the optical modulation device can be effectively kept down.

In the structure that the cooling tube is provided in the holding frame of the optical modulation device, the holding frame functions as both of holding means and cooling means for the optical modulation device. Such a structure allows miniaturization to be easily achieved and is preferably applicable to a small-sized optical device.

Moreover, in the second optical apparatus, the second plate member is formed by molding on the periphery of the cooing tube, and thereby, the second plate member and the cooling tube are in close contact with each other and thermally connected. The plate member contacts well to the cooling tube since the second plate member is formed so as to correspond to the external shape of the cooling tube. This allows thermal transfer between the second plate member and the cooling tube to be improved and the plate member can be preferably applied to a cooling tube with a small diameter.

Therefore, the second optical apparatus is advantageous in reducing a cost and a size.

In this case, it may be arranged that a connection part for connecting the first frame member and the second frame member in molding the second frame member be included.

In the second optical apparatus, it may be arranged that the first plate member be formed from a metal material or a resin material and the second plate member is formed from a resin member, for example.

For example, the resin material may be arranged to include at least one of a resin material in which a metal material is mixed and a resin material in which a carbon material is mixed.

In this case, thermal expansion is preferably at the same degree between the cooling tube and each of the pair of plate members.

In accordance with such a structure, at least one plate member is formed from a resin material having high thermal conductivity, so that a cooling unit can be reduced in weight. Further, the same degree of thermal expansion between the cooling tube and each of the pair of plate members allows a gap to be prevented from being formed between each plate member and the cooling tube due to a difference in thermal deformation in curing and contraction or after molding. Accordingly, the thermal connection therebetween can be stably maintained.

In the second optical apparatus, it may be arranged that a gap between the cooling tube and at least one of the pair of frame members be filled with a thermally conductive material.

In accordance with the above, filling of a thermally conductive material allows thermal transfer between the plate member and the cooling tube to be improved.

The thermal conductivity of the thermally conductive material is preferably 3 W/(m·K) or more, more particularly, 5 W/(m·K) or more. The thermally conductive material having thermal conductivity lower than 3 W/(m·K) is not preferable since heat of the plate member is difficult to be transferred to the cooling tube. When the thermal conductivity of the thermally conductive material is 5 W/(m·K) or more, the heat of the plate member can be well transferred to the cooling tube.

In this case, the thermally conductive material may preferably include at least one of a resin material in which a metal material is mixed, a resin material in which a carbon material is mixed and hot melt, for example.

Further, the thermally conductive material preferably has elasticity within a range of temperature in using the cooling plate.

The thermal conductivity having elasticity expands and contracts in accordance with a change of the gap between the plate member and the cooling tube due to thermal deformation or the like, so that thermal connection between the plate member and the cooling tube can be stably maintained.

Moreover, the first plate member is preferably formed with an auxiliary groove communicating with the gap for at least temporally housing the thermally conductive material.

Such an auxiliary groove allows the quantity of the thermally conductive material, which is to be provided, to be properly adjusted in accordance with the volume of a gap between the first plate member and the cooling tube, so that thermal connection between the first plate member and the cooling tube can be stably maintained.

A third optical apparatus in accordance with the invention is an optical apparatus comprising: an optical device; a holding frame for holding a periphery of the optical device; and a cooling tube, which is provided in the holding frame along the periphery of the optical device and in which a cooling fluid flows, wherein the frame member is formed by molding around the cooling tube from a material having a melting point lower than that of the cooling tube.

In the third optical apparatus, similarly to the first optical apparatus, the cooling tube is provided in the holding frame of the optical device. Accordingly, heat of the optical device is properly removed by means of the cooling fluid flowing in the cooling tube. That is to say, thermal connection between the optical device and the cooling tube via the holding frame allows heat exchange to be performed between the optical device and the cooling fluid in the cooling tube, so that the heat of the optical device is transferred to the cooling fluid in the cooling tube through the holding frame. The transfer of the heat of the optical device to the cooling fluid allows the optical device to be cooled.

The cooling fluid does not transmit luminous flux for forming an image since the cooling tube is provided along the periphery of the optical device. This allows an image of a bubble, dust or the like in the cooling fluid to be prevented from being included in an optical image formed by means of the optical device or a blur of the optical image to be prevented from occurring in accordance with temperature distribution of the cooling fluid.

Further, in the optical apparatus, a path for the cooling fluid is formed from a tube (the cooling tube) on the periphery of the device. This allows a connection part for forming the path to be comparatively reduced. Accordingly, formed is a flow path, which has a small risk of leaking a fluid and which is even and smooth in a flowing direction, so that piping resistance is small.

Therefore, in accordance with the optical apparatus, a disadvantage in using a cooling fluid can be prevented from occurring while a rise in temperature of the optical modulation device can be effectively kept down.

In the structure that the cooling tube is provided in the holding frame of the optical modulation device, the holding frame functions as both of holding means and cooling means for the optical modulation device. Such a structure allows miniaturization to be easily achieved and is preferably applicable to a small-sized optical device.

Moreover, in the third optical apparatus, the plate member is formed by molding on the periphery of the cooing tube, and thereby, the plate member and the cooling tube are in close contact with each other and thermally connected. The plate member contacts well to the cooling tube since the plate member is formed so as to correspond to the external shape of the cooling tube. This allows thermal transfer between the plate member and the cooling tube to be improved and the plate member can be preferably applied to a cooling tube with a small diameter.

Accordingly, the third optical apparatus is advantageous for reducing a cost and a size.

In the third optical apparatus, both of the cooling tube and the plate member may be formed from a metal material, for example.

In this case, thermal expansion of the plate member is preferably higher than that of the cooling tube.

For example, the cooling tube is formed from a copper alloy and the plate member is formed from an aluminum alloy or a magnesium alloy.

The plate member is larger in contraction quantity than the cooling tube in curing and contraction of the plate member since the plate member is higher in thermal expansion than the cooling tube. Accordingly, a gap is prevented from being formed between the plate member and the cooling tube, and thereby, thermal connection therebetween can be stably maintained.

Further, in the third optical apparatus, it may be arranged that the cooling tube be formed from a metal material and the plate member be formed from a resin material having high thermal conductivity, for example.

In this case, thermal expansion is at the same degree between the cooling tube and the plate member.

For example, the resin material may be arranged to include at least one of a resin material in which a metal material is mixed and a resin material in which a carbon material is mixed.

Forming the plate member from a resin material having high thermal conductivity allows a cooling unit to be reduced in weight. Further, the same degree of thermal expansion between the cooling tube and the plate member allows a gap to be prevented from being formed between the plate member and the cooling tube after molding. Accordingly, the thermal connection therebetween can be stably maintained.

In the first, second and third optical apparatuses, the optical device may be arranged to include an optical modulation device for modulating luminous flux from a light source in accordance with image information and/or a polarizing plate on at least one of an incident surface side and an exit surface side of the optical modulation device.

A projector in accordance with the invention is a projector comprising: a light source unit; an optical apparatus for modulating light from the light source unit; a cooling unit for circulating the cooling fluid in the optical apparatus; and a projection optical system for enlarging and projecting light from the optical apparatus.

In accordance with the projector, a rise in temperature of the optical modulation device can be effectively kept down, so that image quality can be improved. Further, the projector allows reduction in cost, miniaturization and efficient cooling to be achieved.

BRIEF DESCRIPTION OF THE DRAWINGS

The invention will be described with reference to the accompanying drawings, wherein like numbers reference like elements.

FIG. 1 is a simplified view of a schematic structure of a projector.

FIG. 4 is a perspective view of a whole structure of an optical apparatus.

FIG. 12 illustrates a modification of the liquid crystal panel holding frame and a liquid crystal panel cooling tube in FIG. 9.

FIG. 13 illustrates another modification of the liquid crystal panel holding frame and a liquid crystal panel cooling tube in FIG. 9.

DESCRIPTION OF THE EMBODIMENTS

Figure 2:
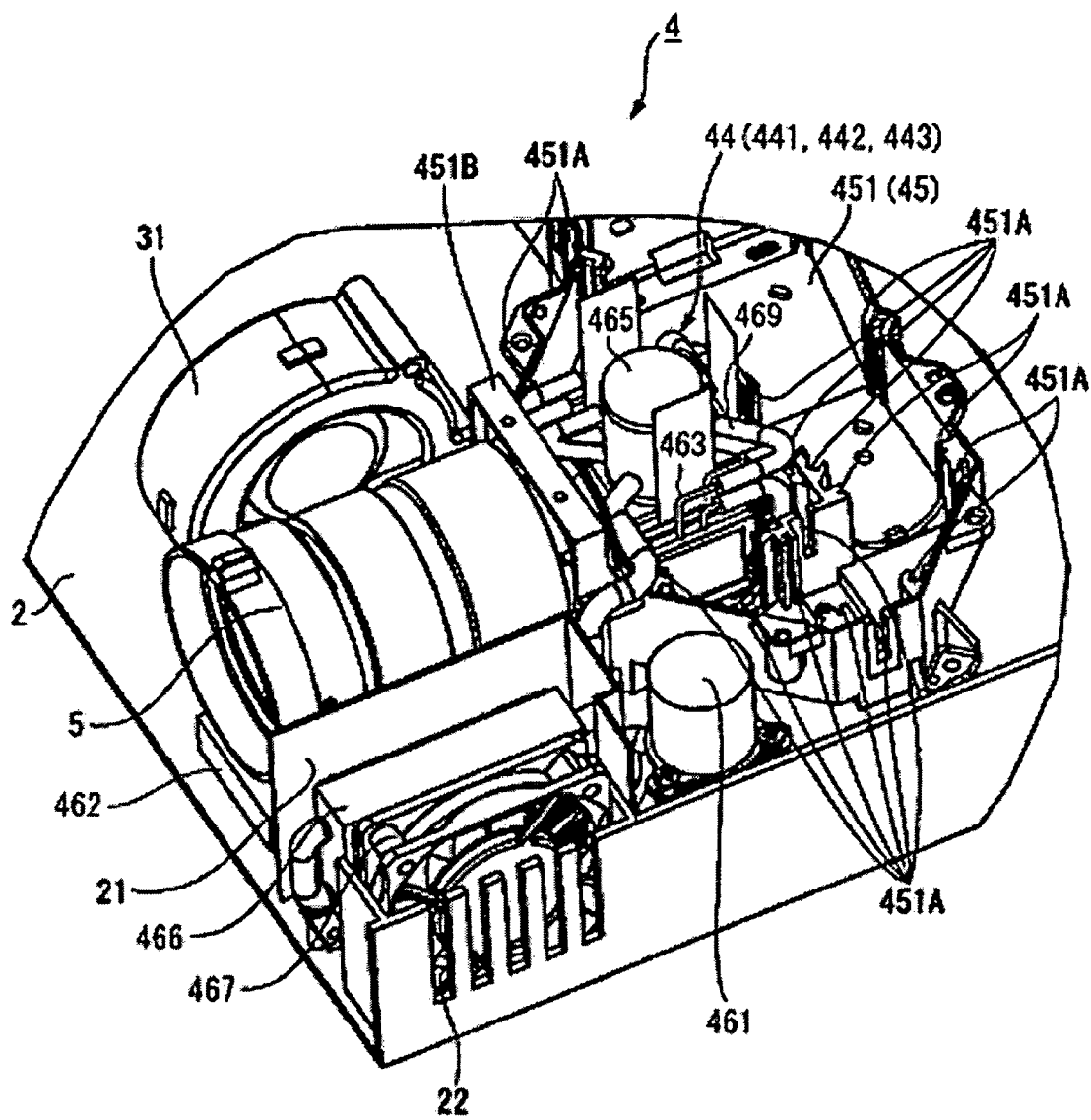
FIG. 2 is a perspective view of a part of the inside of a projector from the upper side.

Embodiments of the invention will be described hereinafter, made reference to the drawings. In the respective drawings, a scale is made different from the actual one in accordance with necessity for the purpose of showing respective components in a size recognizable in the drawings.

Structure of a Projector

FIG. 1 is a simplified view of a schematic structure of a projector 1.

The projector 1 modulates luminous flux emitted from a light source in accordance with image information, forms an optical image and enlarges and projects the formed optical image on a screen. The projector 1 comprises an outer case 2, an air-cooling apparatus 3, an optical unit 4 and a projecting lens 5 used as a projection optical apparatus.

In FIG. 1, provided are a power supply block, a lamp driving circuit and the like in a space where the air-cooling apparatus 3, the optical unit 4 and the projecting lens 5 in the outer case 2 are not provided although they are not shown in the drawing.

The outer case 2 is made of synthetic resin or the like and formed into the shape of a substantially rectangular parallelepiped as a whole in which the air-cooling apparatus 3, the optical unit 4 and the projecting lens 5 are housed. The outer case 2 is formed from an upper case forming each of a ceiling surface, a front surface, a back surface and a side surface of the projector 1 and a lower case forming each of a bottom surface, a front surface, side surface and a back surface of the projector 1 although they are not shown in the drawing. The upper case and the lower case are fixed each other by means of a screw or such.

The outer case 2 is not limited to be made of synthetic resin but may be formed from another material such as metal, for example.

In the outer case 2, formed are an intake for leading air from the outside to the inside of the projector 1 (an intake 22 shown in FIG. 2, for example) and an outlet for exhausting air warmed in the projector 1 although they are not shown in FIG. 1.

Further, the outer case 2 is formed with a partition wall 21 located at a corner part of the outer case 2 beside the projecting lens 5 for separating a radiator 466, an axial flow fan 467 and the like of the optical unit 4, which are mentioned later, from the other members, as shown in FIG. 1.

The air-cooling apparatus 3 is for supply a coolant flow path formed in the projector 1 with cooling air to cool heat generated in the projector 1. The air-cooling apparatus 3 is provided beside the projecting lens 5 and includes a multi-blade fan 31 for leading cooling air from the outside of the projector 1 through an intake formed in the outer case 2, the intake being not shown in the drawing, to the inside and a cooling fan for cooing a power supply block, a lamp driving circuit and the like, which are not shown.

The optical unit 4 is a unit for optically processing luminous flux emitted from a light source to form an optical image (a color image) in accordance with image information. The optical unit 4 extends almost along a back surface of the outer case 2 as a whole and is in a substantially L shape extending along a side surface of the outer case 2 in a plan view, as shown in FIG. 1. The optical unit 4 will be described later in detail.

The projecting lens 5 is arranged as an assembled lens in which plural lenses are assembled. The projecting lens 5 enlarges and projects an optical image (a color image) formed by means of the optical unit 4 on a screen not shown.

Detailed Structure of an Optical Unit

The optical unit 4 comprises an integrator illumination optical system 41, a color dividing optical system 42, a relay optical system 43, an optical apparatus 44, an optical component case 45 and a liquid cooling unit 46, as shown in FIG. 1.

The integrator illumination optical system 41 is an optical system for substantially evenly illuminating an image forming area of a later-mentioned liquid crystal panel forming the optical apparatus 44. The integrator illumination optical system 41 comprises a light source unit 411, a first lens array 412, a second lens array 413, a polarization converting device 414 and a superimposing lens 415, as shown in FIG. 1.

The light source unit 411 comprises a light source lamp 416 for emitting radial rays and a reflector 417 for reflecting radiated light emitted from the light source lamp 416. As the light source lamp 416, frequently used are a halogen lamp, a metal halide lamp and a high pressure mercury lamp. In FIG. 1, a paraboloidal mirror is used as the reflector 417. The invention, however, is not limited to the above. An ellipsoidal mirror may be used so as to use a parallelizing concave lens for forming luminous flux reflected on the ellipsoidal mirror to an exit side of the luminous flux into parallel light.

The first lens array 412 has a structure that small lenses having a substantially rectangular outline in the view of optical axis direction are arranged in a matrix. The respective lenses divide luminous flux emitted from the light source unit 411 into a plurality of partial luminous flux.

The second lens array 413 has a structure substantially same as that of the first lens array 412. In the structure of the second lens array 413, small lenses are arranged in a matrix. The second lens array 413 has a function of forming an image of the respective small lenses of the first lens array 412 on a later-mentioned liquid crystal panel of the optical apparatus 44 together with the superimposing lens 415.

The polarization converting device 414 is provided between the second lens array 413 and the superimposing lens 415 for converting light from the second lens array 413 into substantially one kind of polarized light.

Concretely, partial light converted into substantially one kind of polarized light by means of the polarization converting device 414 is almost superimposed on the later-mentioned liquid crystal panel of the optical apparatus 44 at last by means of the superimposing lens 415. In a projector using a liquid crystal panel of the type that polarized light is modulated, substantially half of the light from the light source unit 411 emitting random polarized light cannot be utilized since only one kind of polarized light can be used. Accordingly, the polarization converting device 414 is used to convert the light emitted from the light source unit 411 into substantially one kind of polarized light for the purpose of improving efficiency of using light in the optical apparatus 44.

The color dividing optical system 42 comprises two dichroic mirrors 421 and 422 and a reflection mirror 423 as shown in FIG. 1. The color dividing optical system 42 has a function of dividing a plurality of partial luminous flux emitted from the integrator illumination optical system 41 into light in three colors of red (R), green (G) and blue (B) by means of the dichroic mirrors 421 and 422.

The relay optical system 43 comprises an incident side lens 431, a relay lens 433 and reflection mirrors 432 and 434 as shown in FIG. 1. The relay optical system 43 has a function of leading light in the blue color, which has been divided by means of the color dividing optical system 42, to a later-mentioned liquid crystal panel for the blue light of the optical apparatus 44.

In the above, a red light component of luminous flux emitted from the integrator illumination optical system 41 is reflected on the dichroic mirror 421 of the color dividing optical system 42 while the dichroic mirror 421 transmits a green light component and a blue light component. The red light reflected on the dichroic mirror 421 is reflected on the reflection mirror 423 to reach a later-mentioned liquid crystal panel for the red light of the optical apparatus 44 through a field lens 418. The field lens 418 converts partial luminous flux emitted from the second lens array 413 into luminous flux parallel to a center axis (a main light beam) of the partial luminous flux. That is the case with field lenses 418 provided on light incident sides of liquid crystal panels for the green light and the blue light.

The green light of the light having passed through the dichroic mirror 421, is reflected on the dichroic mirror 422 to reach a later-mentioned liquid crystal panel for the green light of the optical apparatus 44 through the field lens 418. On the other hand, the blue light passes through the dichroic mirror 422 and the relay optical system 43, and then, further passes through the field lens 418 to reach the later-mentioned liquid crystal panel for the blue light of the optical apparatus 44. The relay optical system 43 is used for the blue light in order to prevent the efficiency in using light from being deteriorated due to radiation of light or such since the length of an optical path of the blue light is longer than that of the light in the other colors. That is to say, the above structure is proposed since the length of an optical path of the partial light in colors, which has been incident on the incident side lens 431, is long. It may be possible, however, to provide another structure such that the length of an optical path of the red light is long.

The optical apparatus 44 is formed into one body from three liquid crystal panels 441 used as an optical modulation device (in which 441R denotes the liquid crystal panel for the red color, 441G denotes the liquid crystal panel for the green color and 441B denotes the liquid crystal panel for the blue color), three incident side polarizing plates 442 and three exit side polarizing plates 443, which are provided on the luminous flux incident side and the luminous flux exit side of the liquid crystal panels 441 and used as an optically converting device, and cross dichroic prism 444 used as a color composite optical apparatus.

The liquid crystal panel 441, which is omitted from concrete drawing, has a structure that liquid crystal, which is an electro-optical substance, is air-tightly contained between a pair of transparent glass substrates. A direction of providing the liquid crystal is controlled in accordance with a driving signal outputted from a control device not shown to modulate a polarization direction of polarized luminous flux emitted from the incident side polarizing plate 442.

Light in the respective colors whose polarization direction is made into substantially one by means of the polarization converting device 414 is incident on the incident side polarizing plates 442. The incident side polarizing plate 442 transmits only polarized light having a substantially same direction as that of a polarizing axis of luminous flux whose polarizing direction is made into substantially one by means of the polarization converting device 414 while the incident side polarizing plate 442 absorbs the other luminous flux (a light absorption type).

The incident side polarizing plate 442, which is omitted from concrete drawing, has a structure that a polarizing film is attached on a translucent substrate such as sapphire glass or crystal. The light absorption type polarizing film is formed from a film, which includes an iodine molecule or a dye molecule, for example, and which is uniaxially extended. An advantage of the light absorption type polarizing film is that an extinction ratio is comparatively high while incident angle dependence is comparatively small.

The exit side polarizing plate 443 has a structure substantially similar to that of the incident side polarizing plate 442. The exit side polarizing plate 443 only transmits luminous flux, which has a polarization axis orthogonal to a transmission axis of luminous flux in the incident side polarizing plate 442, of luminous flux exiting from the liquid crystal panel 441 while the exit side polarizing plate 443 absorbs the other luminous flux (a light absorption type).

The cross dichroic prism 444 is an optical device for composing an optical image modulated for light in every color exiting from the exit side polarizing plate 443 to form a color image. The cross dichroic prism 444 is formed from four right-angled prisms stuck each other into a substantially square shape in a plan view. On sticking surfaces of the right-angled prisms, formed are two dielectric multi-layered films. The dielectric multi-layered films reflect light in colors, which has exited from the liquid crystal panels 441R and 441B and passed through the exit side polarizing plate 443, and transmit light in a color, which has exited from the liquid crystal panel 441G and passed through the exit side polarizing plate 443. The light in the respective colors, which has been modulated by means of the respective liquid crystal panels 441R, 441G and 441B, is composed as described above to form a color image.

The optical component case 45 is formed from a metal member, for example. Inside the optical component case 45, set is a predetermined illumination optical axis A. The above-mentioned optical components 41 to 44 are provided and housed in predetermined positions with respect to the illumination optical axis A. The optical component case 45 is not limited to be formed from a metal member and may be formed from another material. Particularly, it is preferable to form the optical component case 45 from a thermally conductive material.

The liquid cooling unit 46 is for circulating a cooling fluid to mainly cool the optical apparatus 44. The liquid cooling unit 46 comprises a main tank 461 for temporally storing a cooling fluid, a radiator 466 used as a radiating part for radiating heat of the cooling fluid and a axial flow fan 467 for spraying cooling air on the radiator 466 as well as a fluid squeeze part, a device cooling tube, a divergence tank, a confluence tank and a tube part, which are respectively mentioned later.

Figure 3:
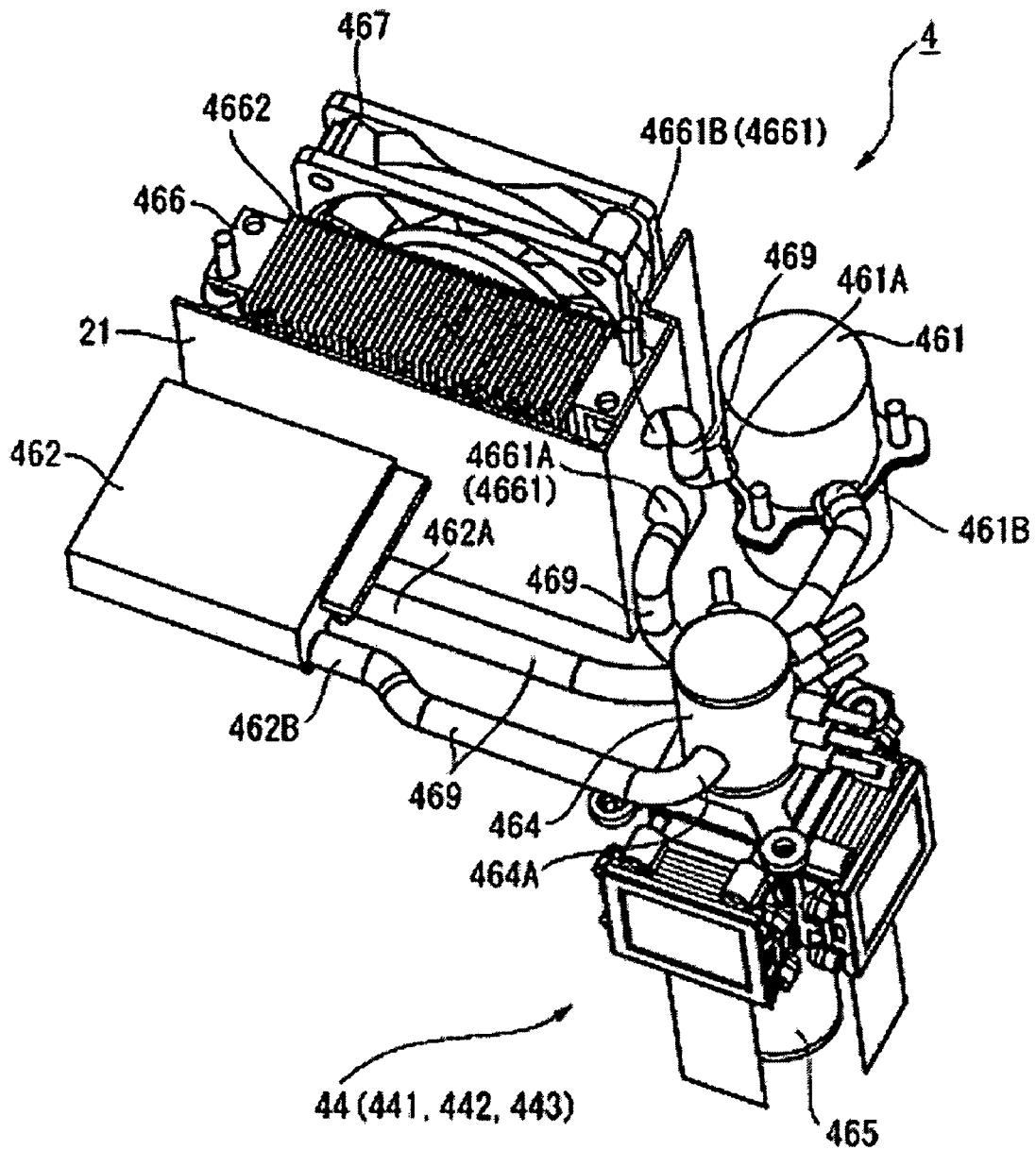
FIG. 3 is a perspective view of an optical apparatus and a liquid cooling unit in a projector from the lower side.

FIG. 2 is a perspective view of a part of the inside of the projector 1 from the upper side. FIG. 3 is a perspective view mainly showing the optical apparatus 44 and the liquid cooling unit 46 in the projector 1 from the lower side.

In FIG. 2, the optical apparatus 44 is only shown among optical components in the optical component case 45 for the purpose of simple description while the other optical components 41 to 43 are omitted from drawing. Further, in FIGS. 2 and 3, a part of members in the liquid cooling unit 46 is omitted from drawing in order to simplify description.

As shown in FIG. 2, the optical component case 45 comprises a component housing member 451 and a lid member not shown for closing an opening part of the component housing member 451.

The component housing member 451 among the above members forms each of a bottom surface, a front surface and side surfaces of the optical component case 45.

Inner side surfaces of the component housing member 451 are formed with grooves 451A for fitting the above-mentioned optical components 41 to 44 therein from the upper side in a sliding manner, as shown in FIG. 2.

At a front part of the side surfaces, formed is a projecting lens setting part 451B for setting the projecting lens 5 at a predetermined position with respect to the optical unit 4, as shown in FIG. 2. The projecting lens setting part 451B is formed into a substantially rectangular shape in the plan view. At a substantially center part of the projecting lens setting part 451B in the plan view, formed is a circular hole, which is not shown, so as to correspond to an exit location of the luminous flux from the optical apparatus 44. A color image formed by means of the optical unit 4 is enlarged and projected on the projecting lens 5 through the hole.

Liquid Cooling Unit

The liquid cooling unit 46 will be described in detail hereinafter.

In FIGS. 2 and 3, the liquid cooling unit 46 comprises a main tank 461, a fluid squeeze part 462 (in FIG. 3), a device cooling tube 463, a divergence tank 464 (in FIG. 3), a confluence tank 465, a radiator 466, an axial flow fan 467 and a tube part 469.

As shown in FIGS. 2 and 3, the main tank 461 is in a substantially columnar shape as a whole and comprises two container-shaped members made of metal such as aluminum.

Opening parts of the two container-shaped members are connected with each other to temporally store a cooling fluid therein. The container-shaped member is connected by seal welding or by providing an elastic member such as a rubber, for example.

In a circumferential surface of the main tank 461, formed are an inflow part 461A and an outflow part 461B as shown in FIG. 3.

The inflow part 461A and the outflow part 461B are formed from tube members and arranged to project inward and outward from the main tank 461. An outward projecting end of the inflow part 461A is connected to an end of the tube part 469 through which a cooling fluid from the outside flows into the main tank 461. Further, an outward projecting end of the outflow part 461B is also connected to an end of the tube part 469 through which a cooling fluid in the main tank 461 flows to the outside.

In the main tank 461, the respective center axes of the inflow part 461A and the outflow part 461B are in a locational relation that the axes are substantially orthogonal each other. This prevent the cooling fluid flowing into the main tank 461 through the inflow part 461A from immediately flowing to the outside through the outflow part 461B, so that a composing operation in the main tank 461 allows quality of the cooling fluid and temperature to be evened. The cooling fluid flowing out from the main tank 461 is sent to the fluid squeeze part 462 through the tube part 469.

The fluid squeeze part 462 sucks a cooling fluid from the main tank 461 and discharges the cooling fluid to the outside toward the divergence tank 464 by force, as shown in FIG. 3. That is to say, the outflow part 461B of the main tank 461 is connected to the inflow part 462A of the fluid squeeze part 462 via the tube part 469 while the outflow part 462B of the fluid squeeze part 462 is connected to the inflow part 464A of the divergence tank 464 via the tube part 469.

Concretely, the fluid squeeze part 462 has a structure that an impeller is provided in a substantially rectangular parallelepiped-shaped hollow member made of metal such as aluminum, for example. Under control by means of a control device not shown, the impeller rotates so that the fluid squeeze part 462 would forcibly suck the cooling fluid stored in the main tank 461 via the tube part 469, and then, discharge the cooling fluid via the tube part 469 to the outside by force. Such a structure allows a thickness in a direction of a rotational axis of the impeller to be reduced, so that miniaturization and space saving can be achieved. In the embodiment, the fluid squeeze part 462 is provided below the projecting lens 5 as shown in FIGS. 2 and 3.

The device cooling tube 463 is provided adjacent to the respective devices of the liquid crystal panel 441, the incident polarizing plate 442 and the exit side polarizing plate 443 of the optical apparatus 44. A heat exchange is carried out between the cooling fluid flowing in the device cooling tube 463 and the respective devices 441, 442 and 443.

FIG. 4 is a perspective view of a whole structure of the optical apparatus 44.

In FIG. 4, the optical apparatus 44 is formed into one body from three liquid crystal panels 441 (the liquid crystal panel for the red light 441R, the liquid crystal panel for the green light 441G and the liquid crystal panel for the blue light 441B), the polarizing plates provided on the incident side and the exit side of the respective liquid crystal panels 441 (the incident side polarizing plates 442 and the exit side polarizing plates 443) and the cross dichroic prism 444, as described above.

That is to say, the exit side polarizing plate 443, the liquid crystal panel 441 and the incident side polarizing plate 442 are piled in this order on the cross dichroic prism 444 for the respective colors of red (R), green (G) and blue (B).

The device cooling tube 463 is individually provided for each of the liquid crystal panel 441, the incident side polarizing plate 442 and the exit side polarizing plate 443.

Concretely, the device cooling tube 463 includes, with respect to the red light, a liquid crystal panel cooling tube 4631R provided on the periphery of the liquid crystal panel 441R, an incident side polarizing plate cooling tube 4632R provided on the periphery of the incident side polarizing plate 442 and an exit side polarizing plate cooling tube 4633R provided on the periphery of the exit side polarizing plate 443. The cooling fluid flows from the inflow parts (IN) of the respective device cooling tubes 4631R, 4632R and 4633R into the respective tubes, flows along the peripheries of the respective devices 441R, 442 and 443, and then, flows out to the outside from the outflow parts (OUT) of the respective tubes.

Similarly, the device cooling tube 463 includes, with respect to the green light, a liquid crystal panel cooling tube 4631G provided on the periphery of the liquid crystal panel 441G, an incident side polarizing plate cooling tube 4632G provided on the periphery of the incident side polarizing plate 442 and an exit side polarizing plate cooling tube 4633G provided on the periphery of the exit side polarizing plate 443. Further, the device cooling tube 463 includes, with respect to the blue light, a liquid crystal panel cooling tube 4631B provided on the periphery of the liquid crystal panel 441B, an incident side polarizing plate cooling tube 4632B provided on the periphery of the incident side polarizing plate 442 and an exit side polarizing plate cooling tube 4633B provided on the periphery of the exit side polarizing plate 443.

In the embodiment, the peripheries of the respective devices of the liquid crystal panel 441, the incident side polarizing plate 442 and the exit side polarizing plate 443 are held in holding frames. In the holding frames, provided are the respective device cooling tubes 463 along and substantially around the peripheries of the respective devices. Inflow parts (IN) and outflow parts (OUT) of the respective device cooling tubes 463 are provided on the same side of the respective devices 441, 442 and 443.

Detail structures of the device holding frames and the device cooling tubes 463 will be described later.

Returning to FIGS. 2 and 3, the divergence tank 464 is for diverging the cooling fluid sent from the fluid squeeze part 462 to the respective device cooling tubes 463, as shown in FIG. 3.

The confluence tank 465 is a place of confluence of the cooling fluids sent from the respective device cooling tubes 463 and is for temporally storing the merged cooling fluids, as shown in FIG. 2.

In the embodiment, the divergence tank 464 is provided on one surface of the cross dichroic prism 444 of the optical apparatus 44 while the confluence tank 465 is provided on the opposite side surface of the cross dichroic prism 444. The divergence tank 464 and the confluence tank 465 are not limited to be provided in the above locations but may be located in other places.

Figure 5:
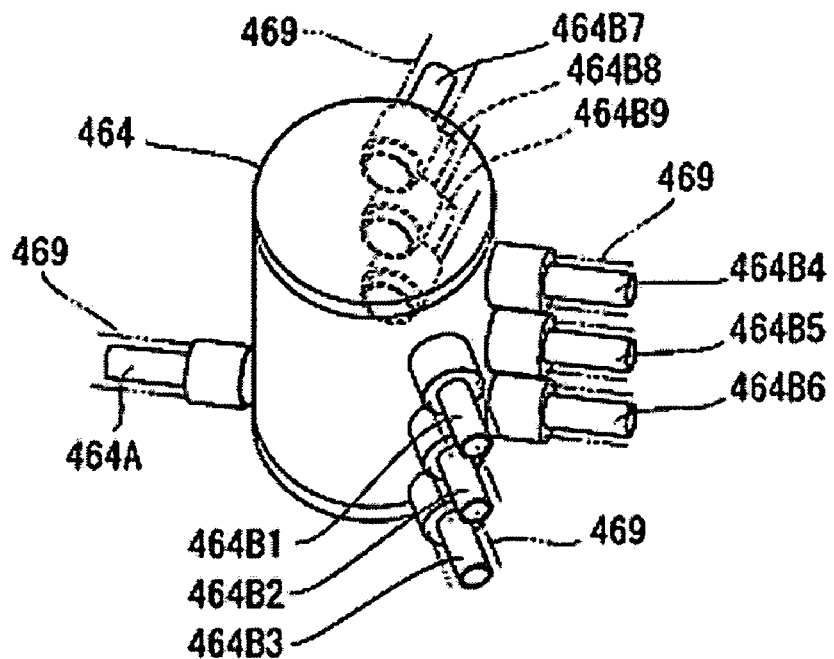
FIG. 5 is a perspective view of a whole structure of a divergence tank.
Figure 6:
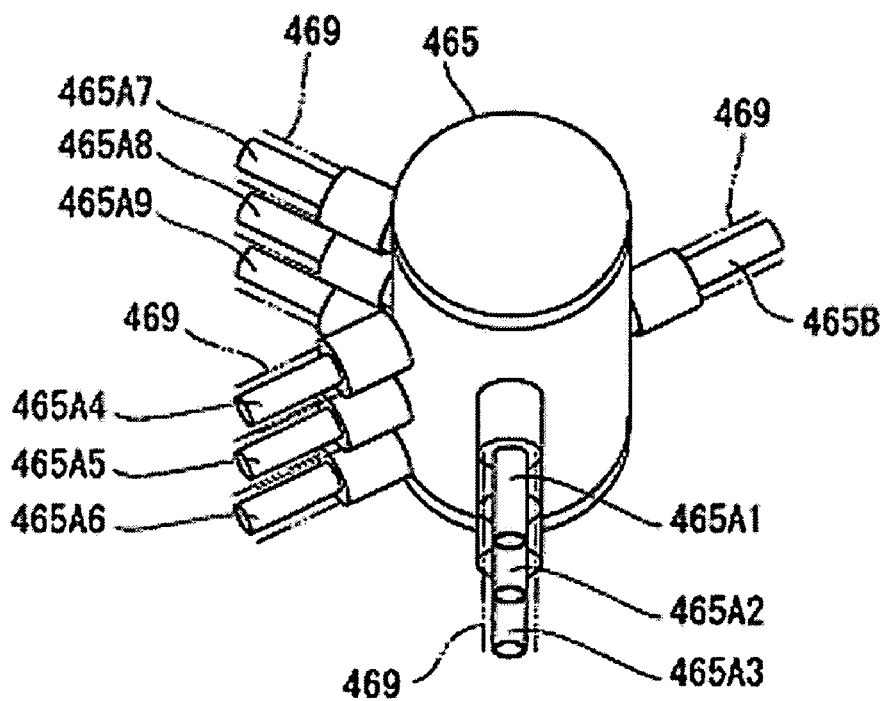
FIG. 6 is a perspective view of a whole structure of a confluence tank.

FIG. 5 is a perspective view of a whole structure of the divergence tank 464. FIG. 6 is a perspective view of a whole structure of the confluence tank 465.

As shown in FIG. 5, the divergence tank 464 is in a substantially columnar shape as a whole, is formed from a sealed container-shaped member made of metal such as aluminum and temporally stores the cooling fluid inside.

In a circumferential surface of the divergence tank 464, formed are a cooling fluid inflow part 464A and outflow parts 464B1, 464B2, . . . and 464B9.

The inflow part 464A and the outflow parts 464B1 to 464B9 are formed from tube members and arranged to project inward and outward from the divergence tank 464. An outward projecting end of the inflow part 464A is connected to an end of the tube part 469 through which a cooling fluid from the fluid squeeze part 462 (refer to FIG. 3) flows into the divergence tank 464. Further, respective outward projecting ends of the outflow parts 464B1 to 464B9 are also individually connected to ends of the tube parts 469 through which the cooling fluid in the divergence tank 464 flows out toward the respective device cooling tubes 463 (refer to FIG. 4).

As shown in FIG. 6, the confluence tank 465 is in a substantially columnar shape as a whole, is formed from a sealed container-shaped member made of metal such as aluminum and temporally stores the cooling fluid inside, similarly to the divergence tank 464.

In a circumferential surface of the confluence tank 465, formed are cooling fluid inflow parts 465A1, 465A2, . . . and 465A9 and an outflow parts 465B.

The inflow parts 465A1 to 465A9 and the outflow part 465B are formed from tube members and arranged to project inward and outward from the confluence tank 465. Respective outward projecting ends of the inflow parts 465A1 to 465A9 are individually connected to ends of the tube parts 469 through which the cooling fluid from the respective device cooling tubes 463 (refer to FIG. 4) flows into the confluence tank 465. Further, an outward projecting end of the outflow part 465B is also connected to an end of the tube part 469 through which the cooling fluid in the confluence tank 465 flows out toward the radiator 466.

Returning to FIGS. 2 and 3, the radiator 466 comprises tube members 4661 in which a cooling fluid flows and plural heat radiation fins 4662 connected to the tube members.

The tube member 4661 is formed from a member having high thermal conductivity such as aluminum. The cooling fluid flowing from an inflow part 4661A flows inside the tube member 4661 to an outflow part 4661B. The inflow part 4661A of the tube member 4661 is connected with the outflow part 465B of the confluence tank 465 via the tube part 469 while the outflow part 4661B of the tube member 4661 is connected with the main tank 461 via the tube part 469.

The plural heat radiation fins 4662 are formed from plate members having high heat conductivity such as aluminum and arranged in parallel. The axial flow fan 467 is arranged to spray cooling air from one surface side of the radiator 466.

In the radiator 466, heat of the cooling fluid flowing in the tube member 4661 is radiated through the radiation fins 4662 while supply of cooling air by means of the axial flow fan 467 facilitates the radiation.

As a material forming the tube part 469, used is metal such as aluminum, for example, and other material such as resin may be used.

For the cooling fluid, ethylene glycol, which is a transparent non-volatile liquid, is used, for example, and another liquid may be used. The cooling fluid in the invention is not limited to liquid but may be gas or a compound of liquid and a solid.

As described above, in the liquid cooling unit 46, the cooling fluid flows via the tubes 469 in the main tank 461, the fluid squeeze part 462, the divergence tank 464, the device cooling tube 463, the confluence tank 465 and the radiator 466 in this order. The cooling fluid then returns from the radiator 466 to the main tank 461 to repeatedly flow in the above course for circulation.

In the liquid cooling unit 46, the cooling fluid flowing in the respective device cooling tubes 463 allows heat of the respective devices 441, 442 and 443 of the optical apparatus 44, the heat being generated due to illumination of luminous flux or such, to be properly removed, so that a rise in temperature of the respective devices 441, 442 and 443 can be kept down. The heat of the respective devices 441, 442 and 443 are transferred to the cooling fluid in the respective device cooling tubes 463 through the holding frames of the respective devices.

Device holding frame and device cooling tube

Now, the device holding frame and the device cooling tube will be described. The following description representatively relates to the red light. The device holding frames and the device cooling tubes for the green light and the blue light are similar to the above.

Figure 7:
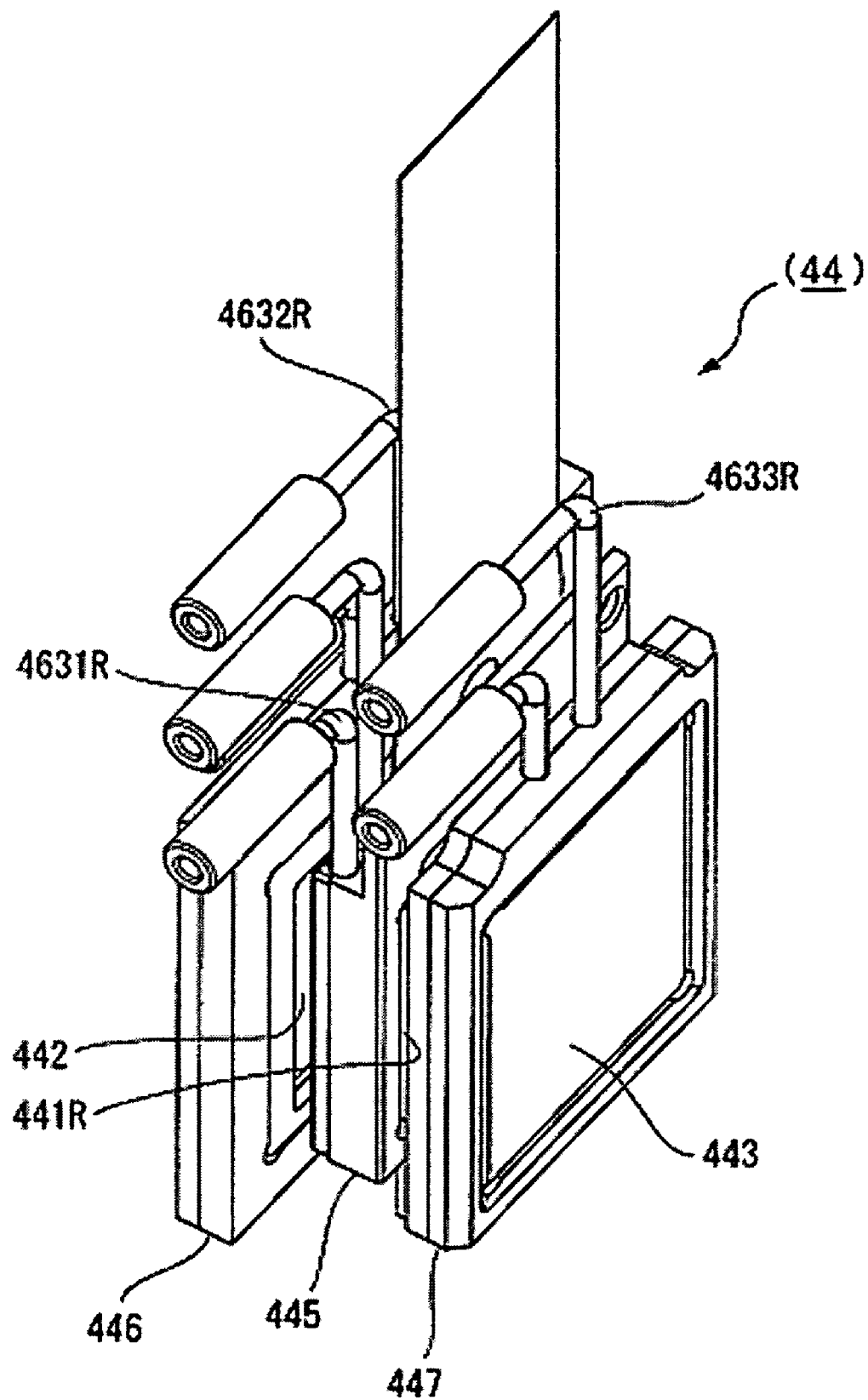
FIG. 7 is a perspective view of a part of a structure of a panel for red light in an optical apparatus.

FIG. 7 is a perspective view of a part of a structure of the panel for the red light in the optical apparatus 44.

As shown in FIG. 7, with respect to the red light, the periphery of the liquid crystal panel 441R is held in the liquid crystal panel holding frame 445, the periphery of the incident side polarizing plate 442 is held in the incident side polarizing plate holding frame 446 and the periphery of the exit side polarizing plate 443 is held in the exit side polarizing plate holding frame 447. The respective holding frames 445, 446 and 447 have later-mentioned rectangular openings corresponding to an image forming area of the liquid crystal panel 441R. The luminous flux passes through the openings.

The liquid crystal panel cooling tube 4631R is provided along the periphery of the liquid crystal panel 441R in the liquid crystal panel holding frame 445, an incident side polarizing plate cooling tube 4632R is provided along the periphery of the incident side polarizing plate 442 in the incident side polarizing plate holding frame 446 and an exit side polarizing plate cooling tube 4633R is provided along the periphery of the exit side polarizing plate 443 in the exit side polarizing plate holding frame 447.

Figure 8:
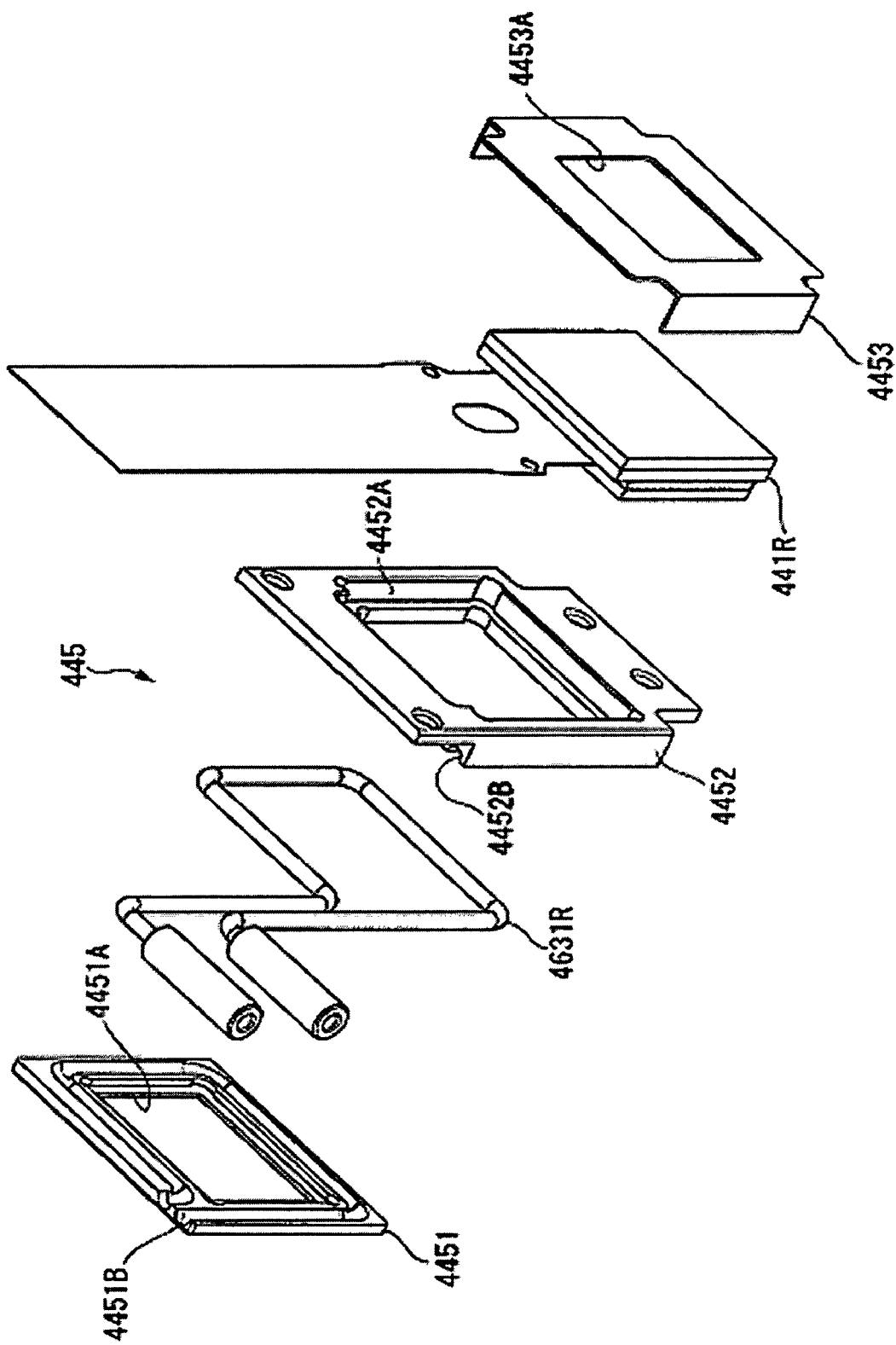
FIG. 8 is an exploded perspective view of a liquid crystal panel holding frame.
Figure 9A:
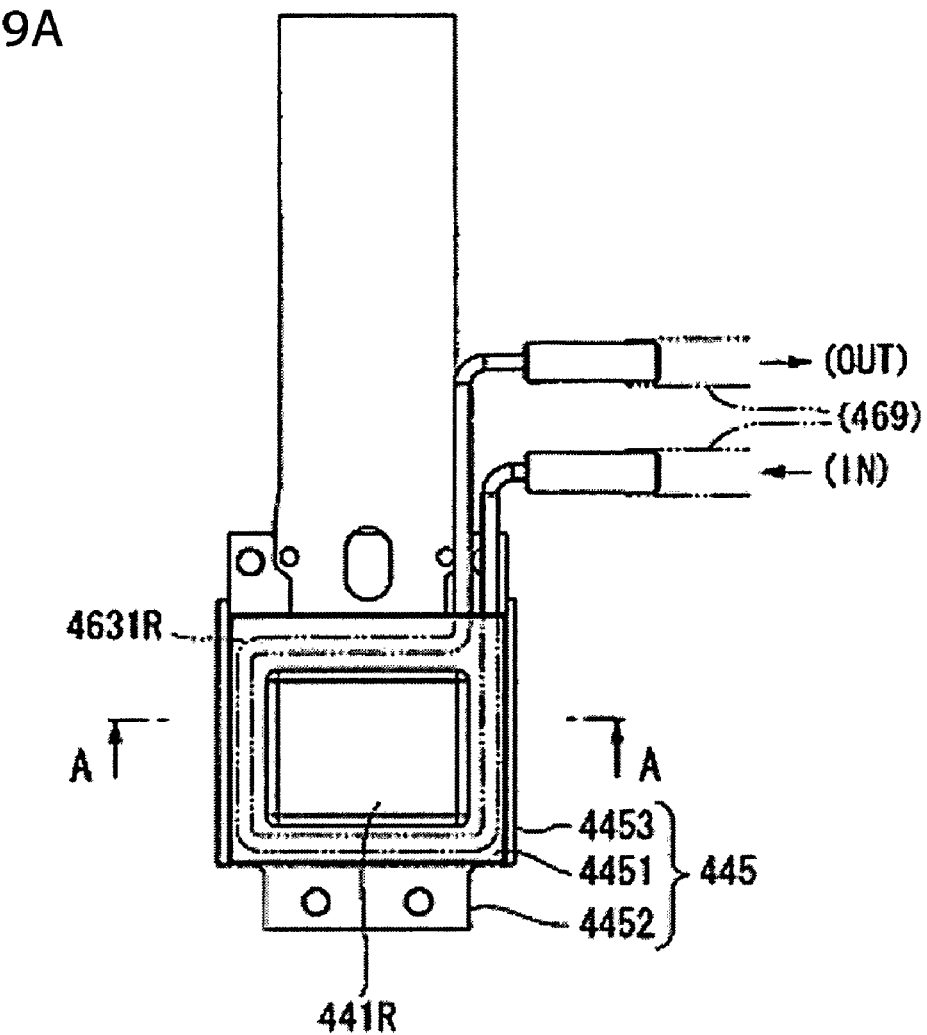
FIG. 9A is a front view of a liquid crystal panel holding frame in assembly.
Figure 9B:
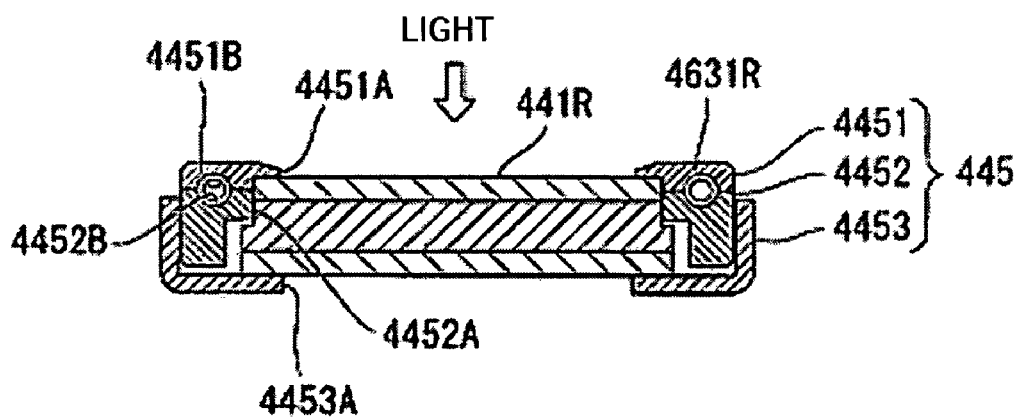
FIG. 9B is a sectional view along a line A-A shown in FIG. 9A.

FIG. 8 is an exploded perspective view of the liquid crystal panel holding frame 445. FIG. 9A is a front view of the liquid crystal panel holding frame in assembly. FIG. 9B is a sectional view along a line A-A shown in FIG. 9A.

The liquid crystal panel holding frame 445 includes a pair of frame members 4451 and 4452 and a liquid crystal panel fixing plate 4453 as shown in FIG. 8.

The liquid crystal panel 441R is of a transmission type and has a structure that a liquid crystal layer is air-tightly contained between the pair of transparent substrates. The pair of substrates includes a driving substrate formed with a data line, scanning line, a switching device, a pixel electrode and the like for applying a driving voltage to the liquid crystal and an opposing substrate formed with a common electrode, a black matrix and the like.

The frame members 4451 and 4452 are respectively substantially rectangular frame bodies in a plan view and comprise rectangular openings 4451A and 4452A corresponding to the image forming area of the liquid crystal panel 441R and grooves 4451B and 4452B for housing the liquid crystal panel cooling tube 4631R. The frame members 4451 and 4452 are oppositely provided so as to sandwich the liquid crystal panel cooling tube 4631R therebetween. For the frame members 4451 and 4452, preferably used is a thermal conductor formed from a material having high thermal conductivity, that is, various kinds of metal such as aluminum (234 W/(m·K)), magnesium (156 W/(m·K)) or an alloy of the above (an aluminum die casting alloy (about 100 W/(m·K)), an Mg—Al—Zn alloy (about 50 W/(m·K)) or the like), for example. The frame members 4451 and 4452 are not limited to be formed from a metal material but may be formed from another material (such as a resin material) having high thermal conductivity (5 W/(m·K) or more, for example).

The liquid crystal panel fixing plate 4453 is formed from a plate member having a rectangular opening 4453A corresponding to the image forming area of the liquid crystal panel 441R, as shown in FIG. 8. The liquid crystal panel fixing plate 4453 is fixed to the frame member 4452 so as to sandwich the liquid crystal panel 441R between the liquid crystal panel fixing plate 4453 and the frame member 4452. The liquid crystal panel fixing plate 4453 is provided in contact with the liquid crystal panel 441R, as shown in FIG. 9B, and has a function of closely adhering the frame members 4451 and 4452 and the liquid crystal panel 441R to each other to thermally connect the same as well as a function of radiating heat of the liquid crystal panel 441R. A part of the heat of the liquid crystal panel 441R is transferred to the frame members 4451 and 4452 through the liquid crystal panel fixing plate 4453.

The liquid crystal panel cooling tube 4631R is formed from a pipe or a tube, which has an annular cross-section, for example, and which extends along a center axis thereof. The liquid crystal panel cooling tube 4631R undergoes a bending-process so as to correspond to the shape of the grooves 4451B and 4452B of the frame members 4451 and 4452, as shown in FIG. 8. For the liquid crystal panel cooling tube 4631R, preferably used is a thermal conductor formed from a material having high thermal conductivity, that is, various kinds of metal such as aluminum, copper, stainless steel or an alloy of the above, for example. The liquid crystal panel cooling tube 4631R is not limited to be formed from a metal material but may be formed from another material (such as a resin material) having high thermal conductivity (5 W/(m·K) or more, for example).

Concretely, the liquid crystal panel cooling tube 4631R is provided on the outer side of the periphery of the liquid crystal panel 441R and along and substantially around the periphery of the liquid crystal panel 441R, as shown in FIGS. 9A and 9B. That is to say, the grooves 4451B and 4452B having a cross section in the shape of a substantially half circle are formed along and substantially around an edges of the openings 4451A and 4452A in the respective inner surfaces (facing surfaces or opposite surfaces) of the frame member 4451 and 4452. The grooves 4451B and 4452B are in a substantially mirror symmetrical shape with respect of each other. The frame members 4451 and 4452 are connected with each other with the liquid crystal panel cooling tube 4631R being housed in the respective grooves 4451B and 4452B. In the embodiment, the liquid crystal panel cooling tube 4631R is a circular pipe and its outer diameter is substantially as much as the thickness of the liquid crystal panel 441R.

The frame members 4451 and 4452 can be connected in various kinds of way such as mechanical connection including connection by means of a screw, adhesion, welding and insertion. In connection, preferably used is a method in which thermal transfer between the liquid crystal panel cooling tube 4631R and the frame members 4451 and 4452 (or the liquid crystal panel 441R) is large.

A concrete structure in connection of the frame members 4451 and 4452 is described later.

The liquid crystal panel cooling tube 4631R is provided on one end thereof with an inflow part (IN) of the cooling fluid and on the other end thereof with an outflow part (OUT). The inflow part and the outflow part of the liquid crystal panel cooling tube 4631R are respectively connected to piping (the tubes 469) for the cooling fluid circulation.

The cooling fluid flowing from the inflow part (IN) into the liquid crystal panel cooling tube 4631R flows along and substantially around the periphery of the liquid crystal panel 441R to flow out from the outflow part (OUT). The cooling fluid takes heat from the liquid crystal panel 441R during its flow in the liquid crystal panel cooling tube 4631R. That is to say, the heat of the liquid crystal panel 441R is transferred to the cooling fluid in the liquid crystal panel cooling tube 4631R through the frame members 4451 and 4452 to be carried out.

As shown in FIG. 9B, in the liquid crystal holding frame 445, the liquid crystal panel cooling tube 4631R is provided closely to the luminous flux incident surface side of the liquid crystal panel 441R in the thickness direction of the liquid crystal panel 441R. In the liquid crystal panel 441R, heat is generally absorbed more on an incident surface side on which a black matrix is provided than an exit surface side. Accordingly, providing the liquid crystal panel cooling tube 4631R closely to the incident surface side on which temperature easily rises allows the heat of the liquid crystal panel 441R is effectively removed.

Further, steps are provided on side surfaces of the liquid crystal panel 441R, so that the area of the exit surface is larger than that of the incident surface. Accordingly, providing the liquid crystal panel cooling tube 4631R closely to the small area of incident surface allows the components to be efficiently arranged, so that the apparatus can be miniaturized.

Figure 10A:
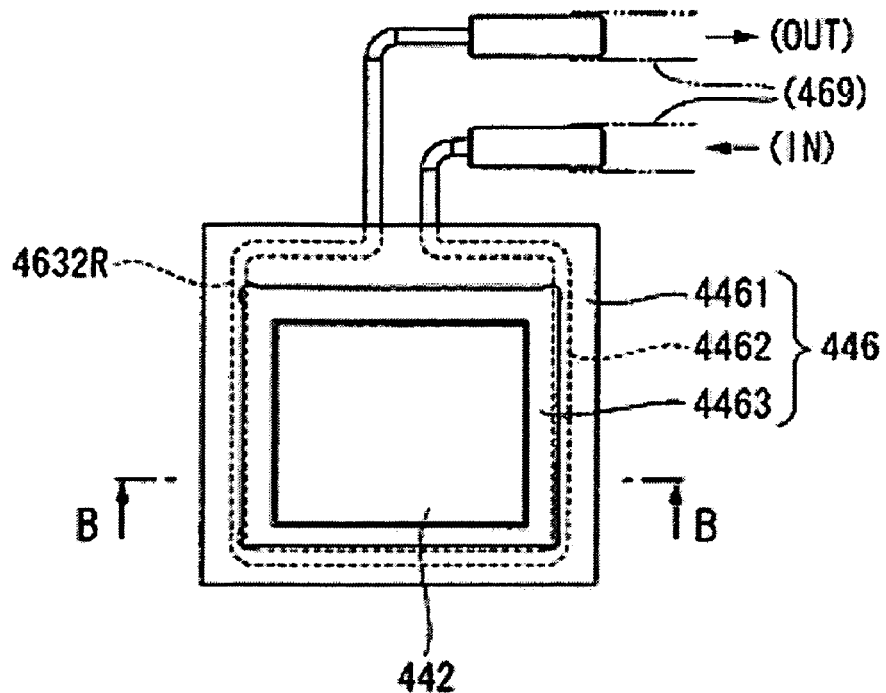
FIG. 10A is a front view of an incident side polarizing plate holding frame in assembly.
Figure 10B:
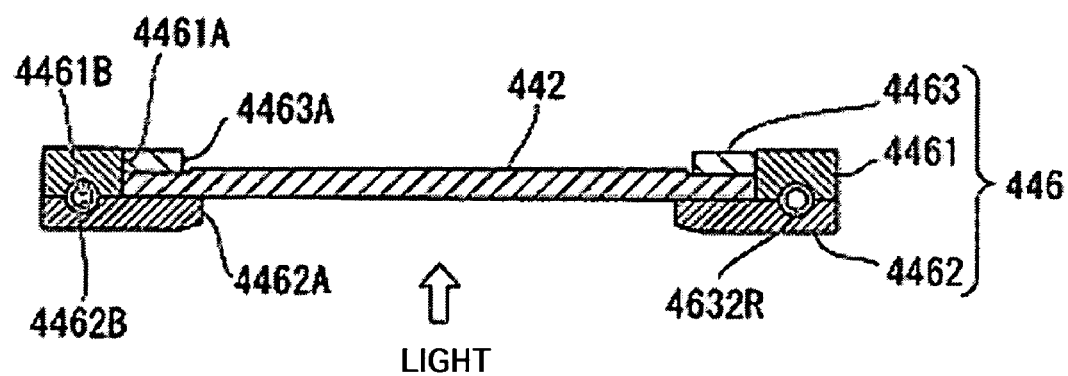
FIG. 10B is a sectional view along a line B-B shown in FIG. 10A.

FIG. 10A is a front view of the incident side polarizing plate holding frame 446 in assembly. FIG. 10B is a cross-sectional view along a line B-B shown in FIG. 10A.

The incident side polarizing plate holding frame 446 has a structure almost similar to that of the liquid crystal panel holding frame 445 (refer to FIG. 8). The incident side polarizing plate holding frame 446 includes a pair of frame members 4461 and 4462 and the polarizing plate fixing plate 4463, as shown in FIGS. 10A and 10B.

The incident side polarizing plate 442 has a structure that a polarizing film is attached on a translucent substrate.

The frame members 4461 and 4462 are substantially rectangular frame bodies in the plan view, respectively. The frame members 4461 and 4462 include rectangular openings 4461A and 4462A corresponding to a light transmitting area of the incident side polarizing plate 442 and grooves 4461B and 4462B for housing the incident side polarizing plate cooling tube 4632R. The frame member 4461 and the frame member 4462 are oppositely provided so as to sandwich the incident side polarizing plate cooling tube 4632R therebetween. For the frame members 4461 and 4462, preferably used is a thermal conductor formed from a material having high thermal conductivity, that is, various kinds of metal such as aluminum, magnesium or an alloy of the above, for example. The frame members 4461 and 4462 are not limited to be formed from a metal material but may be formed from another material (such as a resin material) having high thermal conductivity (5 W/(m·K) or more, for example).

As shown in FIGS. 10A and 10B, the polarizing plate fixing plate 4463 is formed from a plate member having a rectangular opening 4463A corresponding to the light transmitting area of the incident side polarizing plate 442. The polarizing plate fixing plate 4463 is fixed to the frame member 4461 so as to sandwich the incident side polarizing plate 442. The polarizing plate fixing plate 4463 is provided in contact with the incident side polarizing plate 442 and has a function of closely adhering the frame members 4461 and 4462 and the incident side polarizing plate 442 to each other to thermally connect the same as well as a function of radiating heat of the incident side polarizing plate 442, as shown in FIG. 10B. A part of the heat of the incident side polarizing plate 442 is transferred to the frame members 4461 and 4462 through the polarizing plate fixing plate 4463.

The incident side polarizing plate cooling tube 4632R is formed from a seamless pipe formed by drawing or ironing, for example. The incident side polarizing plate cooling tube 4632R undergoes a bending process so as to correspond to the shape of the grooves 4461B and 4462B of the frame members 4461 and 4462. For the incident side polarizing plate cooling tube 4632R, preferably used is a thermal conductor formed from a material having high thermal conductivity, that is, various kinds of metal such as aluminum, copper, stainless steel or an alloy of the above, for example. The incident side polarizing plate cooling tube 4632R is not limited to be formed from a metal material but may be formed from another material (such as a resin material) having high thermal conductivity (5 W/(m·K) or more, for example).

Concretely, the incident side polarizing plate cooling tube 4632R is provided on the outer side of the periphery of the incident side polarizing plate 442 along and substantially around the periphery of the incident side polarizing plate 442, as shown in FIGS. 10A and 10B. That is to say, the grooves 4461B and 4462B having a cross section in the shape of a substantially half circle are formed along and substantially around an edges of the openings 4461A and 4462A in the respective inner surfaces (facing surfaces or opposite surfaces) of the frame members 4461 and 4462. The grooves 4461B and 4462B are in a substantially mirror symmetrical shape with respect to each other. The frame members 4461 and 4462 are connected with each other with the incident side polarizing plate cooling tube 4632R being housed in the respective grooves 4461B and 4462B. In the embodiment, the incident side polarizing plate cooling tube 4632R is a circular pipe and its outer diameter is substantially as much as the thickness of the incident side polarizing plate 442.

The frame members 4461 and 4462 can be connected in various kinds of way such as mechanical connection including connection by means of a screw, adhesion, welding and insertion. In connection, preferably used is a method in which thermal transfer between the incident side polarizing plate cooling tube 4632R and the frame members 4461 and 4462 (or the incident side polarizing plate 442) is large.

The incident side polarizing plate cooling tube 4632R is provided on one end thereof with an inflow part (IN) of the cooling fluid and on the other end thereof with an outflow part (OUT). The inflow part and the outflow part of the incident side polarizing plate cooling tube 4632R are respectively connected to piping (the tubes 469) for the cooling fluid circulation.

The cooling fluid flowing from the inflow part (IN) into the incident side polarizing plate cooling tube 4632R flows along and substantially around the periphery of the incident side polarizing plate 442 to flow out from the outflow part (OUT). The cooling fluid takes heat from the incident side polarizing plate 442 during its flow in the incident side polarizing plate cooling tube 4632R. That is to say, the heat of the incident side polarizing plate 442 is transferred to the cooling fluid in the incident side polarizing plate cooling tube 4632R through the frame members 4461 and 4462 to be carried out.

Figure 11A:
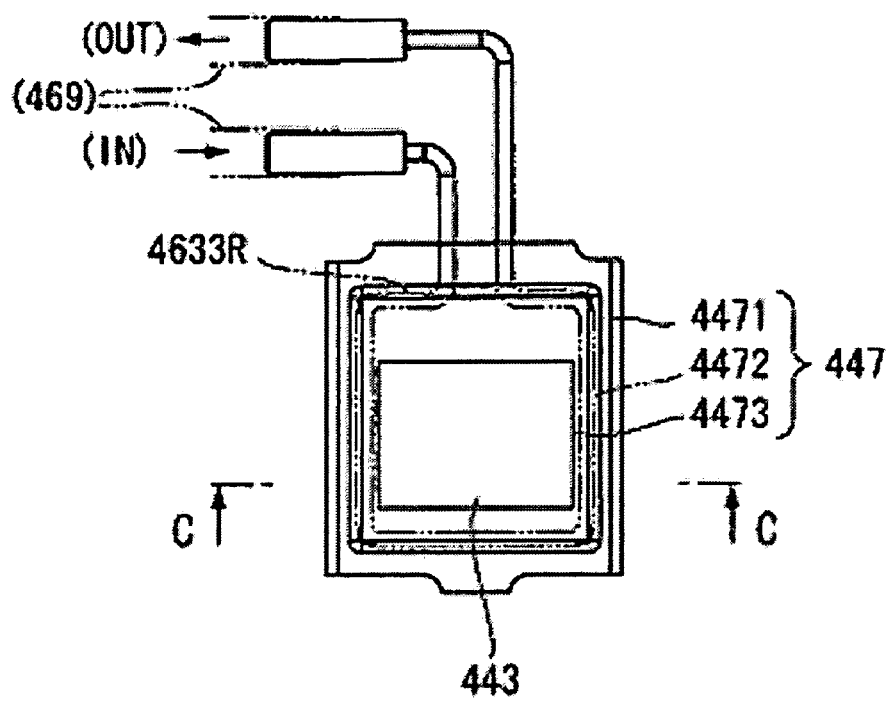
FIG. 11A is a front view of an exit side polarizing plate holding frame in assembly.
Figure 11B:
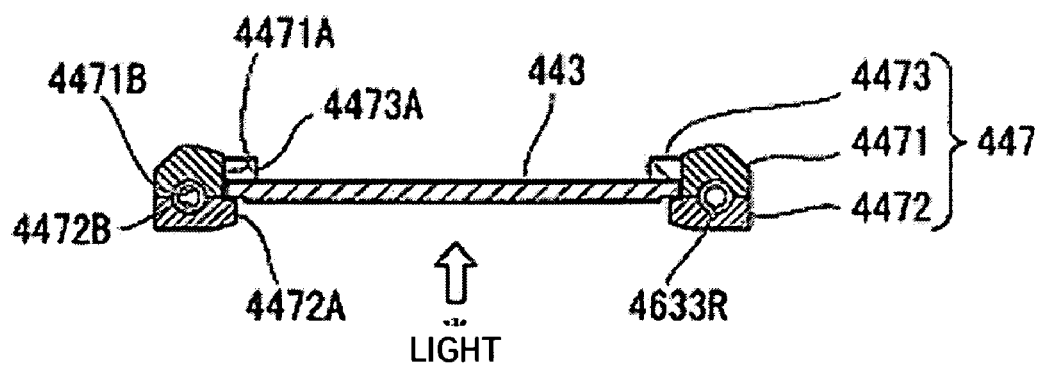
FIG. 11B is a sectional view along a line C-C shown in FIG. 11A.

FIG. 11A is a front view of the exit side polarizing plate holding frame 447 in assembly. FIG. 11B is a sectional view along a line C-C shown in FIG. 11A.

The exit side polarizing plate holding frame 447 has a structure similar to that of the incident side polarizing plate holding frame 446 (refer to FIG. 10). The exit side polarizing plate holding frame 447 includes a pair of frame members 4471 and 4472 and the polarizing plate fixing plate 4473, as shown in FIGS. 11A and 11B.

The exit side polarizing plate 443 has a structure that a polarizing film is attached on a translucent substrate, similarly to the case of the incident side polarizing plate 442.

The frame members 4471 and 4472 are substantially rectangular frame bodies in the plan view, respectively. The frame members 4471 and 4472 include rectangular openings 4471A and 4472A corresponding to a light transmitting area of the exit side polarizing plate 443 and grooves 4471B and 4472B for housing the exit side polarizing plate cooling tube 4633R. The frame member 4471 and the frame member 4472 are oppositely provided so as to sandwich the exit side polarizing plate cooling tube 4633R therebetween. For the frame members 4471 and 4472, preferably used is a thermal conductor formed from a material having high thermal conductivity, that is, various kinds of metal such as aluminum, magnesium or an alloy of the above, for example. The frame members 4471 and 4472 are not limited to be formed from a metal material but may be formed from another material (such as a resin material) having high thermal conductivity (5 W/(m·K) or more, for example).

As shown in FIGS. 11A and 11B, the polarizing plate fixing plate 4473 is formed from a plate member having a rectangular opening 4473A corresponding to the light transmitting area of the exit side polarizing plate 443. The polarizing plate fixing plate 4463 is fixed to the frame member 4471 so as to sandwich the exit side polarizing plate 443. The polarizing plate fixing plate 4473 is provided in contact with the exit side polarizing plate 443 and has a function of closely adhering the frame members 4471 and 4472 and the exit side polarizing plate 443 to each other to thermally connect the same as well as a function of radiating heat of the exit side polarizing plate 443, as shown in FIG. 11B. A part of the heat of the exit side polarizing plate 443 is transferred to the frame members 4471 and 4472 through the polarizing plate fixing plate 4473.

The exit side polarizing plate cooling tube 4633R is formed from a seamless pipe formed by drawing or ironing, for example. The exit side polarizing plate cooling tube 4633R undergoes a bending process so as to correspond to the shape of the grooves 4471B and 4472B of the frame members 4471 and 4472. For the exit side polarizing plate cooling tube 4633R, preferably used is a thermal conductor formed from a material having high thermal conductivity, that is, various kinds of metal such as aluminum, copper, stainless steel or an alloy of the above, for example. The exit side polarizing plate cooling tube 4633R is not limited to be formed from a metal material but may be formed from another material (such as a resin material) having high thermal conductivity (5 W/(m·K) or more, for example).

Concretely, the exit side polarizing plate cooling tube 4633R is provided on the outer side of the periphery of the exit side polarizing plate 443 along and substantially around the periphery of the exit side polarizing plate 443, as shown in FIGS. 11A and 11B. That is to say, the grooves 4471B and 4472B having a cross section in the shape of a substantially half circle are formed along and substantially around an edges of the openings 4471A and 4472A in the respective inner surfaces (facing surfaces or opposite surfaces) of the frame members 4471 and 4472. The grooves 4471B and 4472B are in a substantially mirror symmetrical shape with respect to each other. The frame members 4471 and 4472 are connected with each other with the exit side polarizing plate cooling tube 4633R being housed in the respective grooves 4471B and 4472B. In the embodiment, the exit side polarizing plate cooling tube 4633R is a circular pipe and its outer diameter is substantially as much as the thickness of the exit side polarizing plate 443.

The frame members 4471 and 4472 can be connected in various kinds of way such as mechanical connection including connection by means of a screw, adhesion, welding and insertion. In connection, preferably used is a method in which thermal transfer between the exit side polarizing plate cooling tube 4633R and the frame members 4471 and 4472 (or the exit side polarizing plate 443) is large.

The exit side polarizing plate cooling tube 4633R is provided on one end thereof with an inflow part (IN) of the cooling fluid and on the other end thereof with an outflow part (OUT). The inflow part and the outflow part of the exit side polarizing plate cooling tube 4633R are respectively connected to piping (the tubes 469) for the cooling fluid circulation.

The cooling fluid flowing from the inflow part (IN) into the exit side polarizing plate cooling tube 4633R flows along and substantially around the periphery of the exit side polarizing plate 443 to flow out from the outflow part (OUT). The cooling fluid takes heat from the exit side polarizing plate 443 during its flow in the exit side polarizing plate cooling tube 4633R. That is to say, the heat of the exit side polarizing plate 443 is transferred to the cooling fluid in the exit side polarizing plate cooling tube 4633R through the frame members 4471 and 4472 to be carried out.

As described above, in the embodiment, the device cooling tubes 4631R, 4632R, 4633R for the red right are provided in the holding frames 445, 446 and 447 of the respective devices of the liquid crystal panel 441R, the incident side polarizing plate 442 and the exit side polarizing plate 443. The cooling fluid flowing in the device cooling tubes 4631R, 4632R and 4633R properly removes heat of the respective devices 441R, 442 and 443. That is to say, the respective devices 441R, 442 and 443 are thermally connected with the device cooling tubes 4631R, 4632R and 4633R through the respective holding frames 445, 446 and 447 and a heat exchange between the respective devices 441R, 442 and 443 and the cooling fluid in the device cooling tubes 4631R, 4632R and 4633R allows the heat of the respective devices 441R, 442 and 443 to be transferred to the cooling fluid in the device cooling tubes 4631R, 4642R and 4633R through the holding frames 445, 446 and 447. The heat of the respective devices 441R, 442 and 443 then moves to the cooling fluid, so that the respective devices 441R, 442 and 443 are cooled.

In the embodiment, the respective cooling tubes 4631R, 4632R and 4633R are provided along and substantially around the peripheries of the respective devices 441R, 442 and 443, so that the thermal transferring area is enlarged, and thereby, the respective devices are effectively cooled.

Moreover, the paths for the cooling fluid (the device cooling tubes 4631R, 4632R and 4633R) are provided along the peripheries of the respective devices 441R, 442 and 443, so that the luminous flux for forming an image does not pass through the cooling fluid. Accordingly, an optical image formed on the liquid crystal panel 441R includes no image of a bubble or dust contained in the cooling fluid and a blur of the optical image can be prevented from occurring in accordance with distribution of temperature of the cooling fluid.

In addition, in the embodiment, the paths for the cooling fluid on the peripheries of the respective devices 441R, 442 and 443 are formed from tubes (the device cooling tubes 4631R, 4632R and 4633R). Accordingly, a comparatively small number of joint parts are required for forming the paths. The small number or area of the joint parts allows the structure to be simplified and the cooling fluid to be prevented from leaking.

As described above, in accordance with the invention, problems in using the cooling fluid can be solved while a rise in temperature of the respective devices 441R, 442 and 443 can be effectively kept down.

In the structure that the device cooling tubes 4631R, 4632R and 4633R are provided in the device holding frames 445, 446 and 447, the holding frames 445, 446 and 447 are used as both of holding means and cooling means of the respective devices 441R, 442 and 443. This results in easy miniaturization, and therefore, preferable application to a compact optical device.

For example, in the embodiment, provided on the outer side of the peripheries of the respective devices 441R, 442 and 443 are the device cooling tubes 4631R, 4632R and 4633R having outer diameters substantially as much as the thickness of the respective devices. This allows enlargement in the thickness direction due to existence of the path for the cooling fluid to be kept down.

Figure 12A:
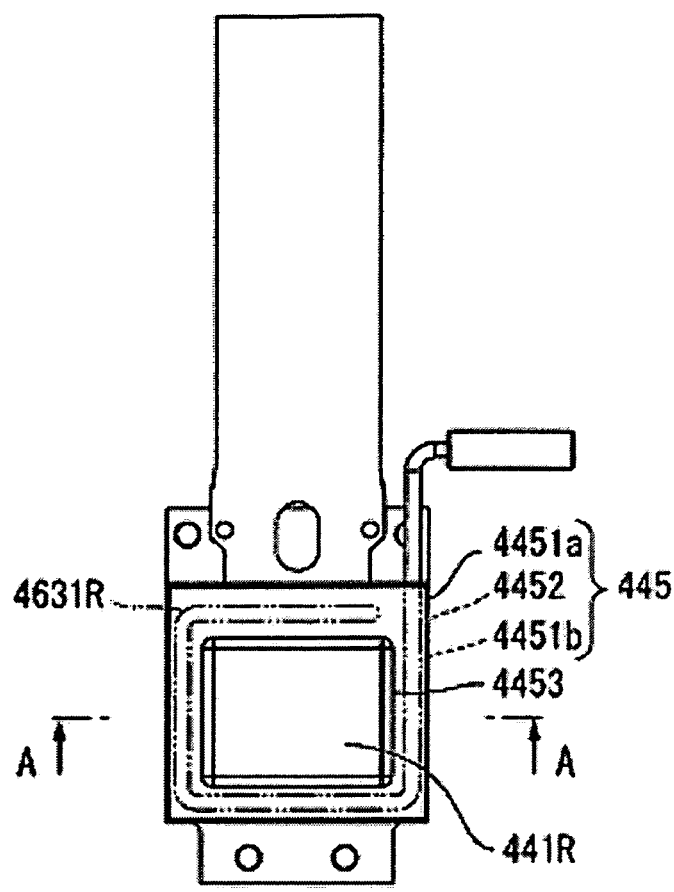
FIG. 12A is a front view of the liquid crystal panel holding frame in assembly.
Figure 12B:
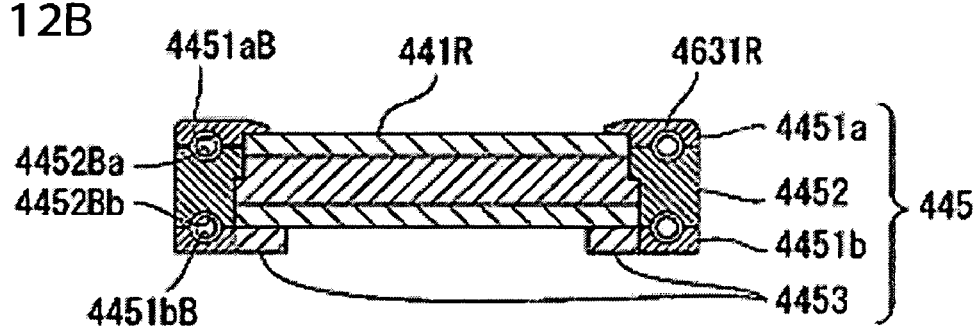
FIG. 12B is a sectional view along a line A-A in FIG. 12A.
Figure 12C:
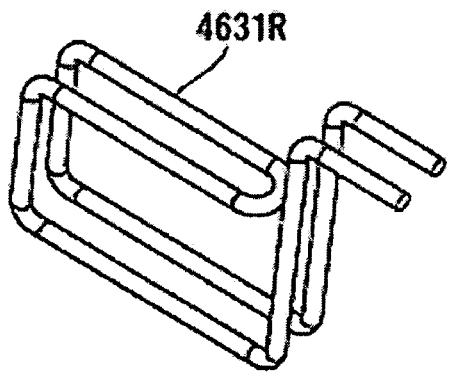
FIG. 12C is a perspective view of the liquid crystal panel cooling tube.

FIG. 12 illustrates a modification of the liquid crystal panel holding frame 445 in FIG. 9 and the liquid crystal panel cooling tube 4631R. FIG. 12A is a front view of the liquid crystal panel holding frame 445 in assembly. FIG. 12B is a sectional view along a line A-A in FIG. 12A. FIG. 12C is a perspective view of the liquid crystal panel cooling tube 4631R.

In the example in FIG. 12, the liquid crystal panel cooling tube 4631R is provided so as to be multifold (twofold, in the embodiment) in the thickness direction of the liquid crystal panel 441R.

That is to say, as shown in FIGS. 12A to 12C, the liquid crystal panel cooling tube 4631R having a circular cross section extends along and substantially around the periphery of the liquid crystal panel 441R in the liquid crystal panel holding frame 445 and is folded to extend substantially around the periphery in a reverse direction. Such a tube can be formed in a so-called forming process. In the respective inner surfaces (facing surfaces or opposite surfaces) of the frame members 4451a, 4451b and 4452, the grooves 4451aB, 4451bB, 4452Ba and 4452Bb having a cross section in the shape of a substantially half circle are formed along and substantially around the periphery of the liquid crystal panel 441R. The grooves 4451aB and 4452Ba and the grooves 4451bB and 4452Bb are respectively in a substantially mirror symmetrical shape with respect of each other. The frame members 4451a, 4451b and 4452 are connected to each other with the liquid crystal panel cooling tube 4631R being housed in the respective grooves 4451aB, 4451bB, 4452Ba and 4452Bb.

In the modification, the liquid crystal panel cooling tube 4631R is provided so as to be multifold in the thickness direction of the liquid crystal panel 441R. This allows the cooling area to be enlarged in the thickness direction, so that further effective cooling can be achieved. The liquid crystal panel cooling tube 4631R is not limited to be provided double, but may be provided triple or more. Similar modification is possible for the incident side polarizing plate cooling tube 4632R (refer to FIG. 10) and the emit side polarizing plate cooling tube 4633R (refer to FIG. 11).

Figure 13A:
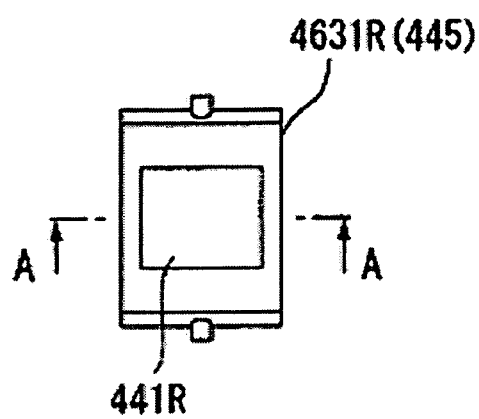
FIG. 13A is a front view of the liquid crystal panel holding frame in assembly.
Figure 13B:
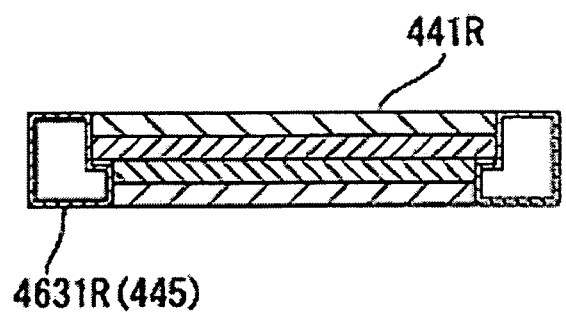
FIG. 13B is a sectional view along a line A-A in FIG. 13A.

FIG. 13 illustrates another modification of the liquid crystal panel holding frame 445 in FIG. 9 and the liquid crystal panel cooling tube 4631R. FIG. 13A is a front view of the liquid crystal panel holding frame 445 in assembly and FIG. 13B is a sectional view along a line A-A in FIG. 13A.

In the modification in FIG. 13, the liquid crystal panel cooling tube 4631R is formed as a holding frame for holding the liquid crystal panel 441R (the liquid crystal panel holding frame 445).

That is to say, as shown in FIGS. 13A and 13B, the liquid crystal panel cooling tube 4631R having a substantially rectangular cross section is provided in the shape of a frame along the periphery of the liquid crystal panel 441R. The liquid crystal panel 441R is held in a center opening of the liquid crystal panel cooling tube 4631R. The thickness of the liquid crystal panel cooling tube 4631R is almost same as that of the liquid crystal panel 441R.

In the modification, the liquid crystal panel cooling tube 4631R is formed as a holding frame for holding the liquid crystal panel 441R (the liquid crystal panel holding frame 445), so that thermal transfer is directly carried out between the liquid crystal panel 441R and the liquid crystal panel cooling tube 4631R. This allows the heat of the liquid crystal panel 441R to be effectively removed by means of the cooling fluid.

Figure 14A:
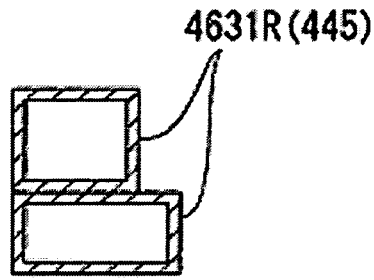
FIG. 14 illustrates a modification of the liquid crystal panel holding frame in FIG. 13.
Figure 14B:
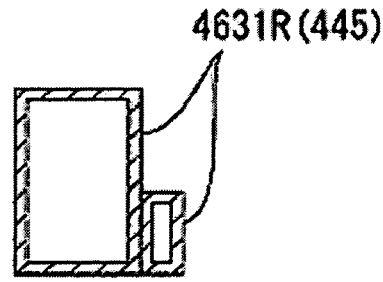

As shown in FIGS. 14A and 14B, the liquid crystal panel cooling tube 4631R may be formed by assembling plural tube members having substantially rectangular cross-sections. It may be also formed so as to have a spiral flow path formed by providing a plate member inside thereof. Similar modification is possible for the incident side polarizing plate cooling tube 4632R (refer to FIG. 10) and the exit side polarizing plate cooling tube 4633R (refer to FIG. 11).

A typical structure of a panel for the red light in the optical apparatus 44 (refer to FIG. 4) and a typical cooling structure thereof are described above. Similar structures are provided for the green light and the blue light. The respective devices (the liquid crystal panel, the incident side polarizing plate and the exit side polarizing plate) are individually held in holding frames in which the device cooling tubes are provided.

That is to say, in the embodiment, totally nine optical devices including three liquid crystal panels 441R, 441G and 441B, three incident side polarizing plates 442 and three exit side polarizing plates 443 are individually cooled by means of the cooling fluid. Individually cooling the respective devices allows the problems due to a rise in temperature of the respective devices to be certainly prevented from occurring.

Piping System

Figure 15:
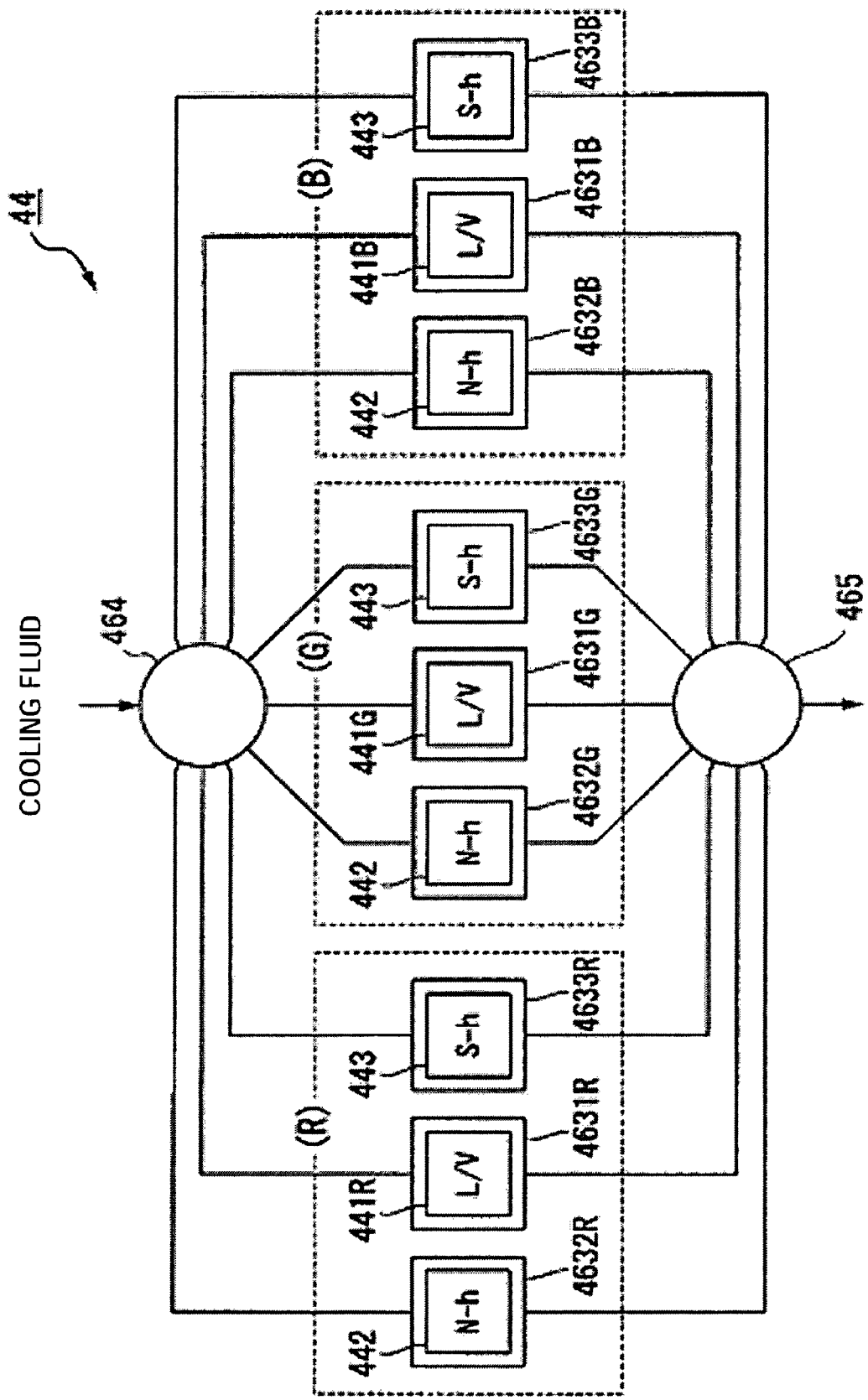
FIG. 15 illustrates a piping system showing a flow of a cooling fluid in an optical apparatus.

FIG. 15 illustrates a piping system showing a flow of the cooling fluid in the optical apparatus 44.

As shown in FIG. 15, in the embodiment, paths for the cooling fluid are provided in parallel for totally nine optical devices including three liquid crystal panels 441R, 441G and 441B, three incident side polarizing plates 442 and three exit side polarizing plates 443 in the optical apparatus 44.

Concretely, three device cooling tubes including the liquid crystal panel cooling tube 4631R, the incident side polarizing plate cooling tube 4632R and the exit side polarizing plate cooling tube 4633R for the red light are respectively connected to the divergence tank 464 at one end thereof and to the confluence tank 465 at the other end. Similarly, three device cooling tubes 4631G, 4632G and 4633G for the green light and three device cooling tubes 4631B, 4632B and 4633B for the blue light are also connected respectively to the divergence tank 464 at one end thereof and to the confluence tank 465 at the other end. As a result, the nine device cooling tubes are provided in parallel in the paths for the cooling fluid between the divergence tank 464 and the confluence tank 465.

The cooling fluid diverges into three paths for every color, that is, totally nine paths in the divergence tank 464 to flow in the nine device cooling tubes (4631R, 4632R, 4633R, 4631G, 4632G, 4633G, 4631B, 4632B and 4633B) in parallel. The cooling fluid flowing into the respective device cooling tubes is of an almost same temperature since the nine device cooling tubes are provided in parallel in the path for the cooling fluid. A flow of the cooling fluid in the respective device cooling tubes along the peripheries of the respective devices allows the respective devices to be cooled and the temperature of the cooling fluid flowing in the respective cooling tubes to rise. After the heat exchange, the cooling fluid is confluent in the confluence tank 465 to be cooled by heat radiation in the radiator 466 (refer to FIG. 3) described above. The divergence tank 464 is supplied again with the cooling fluid, which has been lowered in temperature.

In the embodiment, the nine device cooling tubes corresponding to the nine optical devices are provided in parallel in the path for the cooling fluid. Accordingly, the length of the path for the cooling fluid from the divergence tank 464 to the confluence tank 465 is comparatively short, and therefore, resistance of the path due to a pressure loss in the path is small. This enables the flow rate of the cooling fluid to be easily secured even when the respective device cooling tube has a small diameter. Further, the respective devices are supplied with the cooling fluid of a comparatively low temperature, and therefore, the respective devices are cooled effectively.

It may be possible to omit to provide the device cooling tube for a device with less heat generation among the nine optical devices. In the case that the incident side polarizing plate 442 or the exit side polarizing plate 443 is an inorganic polarizing plate, which absorbs little luminous flux, for example, a cooling tube for the plate may be arranged to be omitted.

The invention is not limited to the structure that plural device cooling tubes are all provided in parallel in the path for the cooling fluid. At least a part of the tubes may be arranged in series. In this case, the path can be defined in accordance with calorific values of the respective devices.

Figure 16:
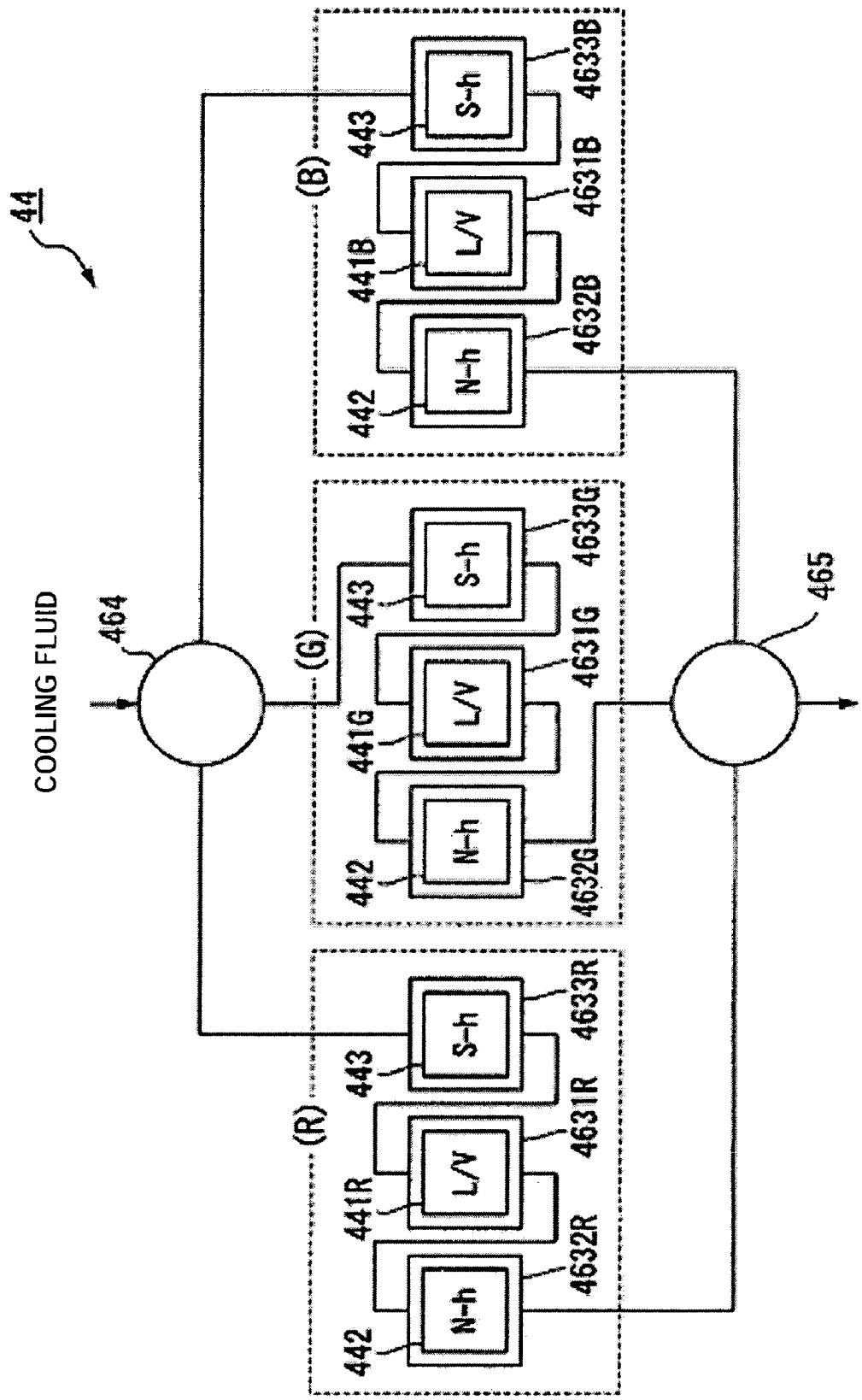
FIG. 16 illustrates a modification of the piping system.

FIG. 16 illustrates a modification of the piping system. Same reference signs and numerals are given to components common with those of FIG. 15.

In the modification in FIG. 16, in the optical apparatus 44 the device cooling tubes (4631R, 4632R, 4633R, 4631G, 4632G, 4633G, 4631B, 4632B and 4633B) are respectively provided for the totally nine optical devices including three liquid crystal panels 441R, 441G and 441B, three incident side polarizing plates 442 and three exit side polarizing plates 443 while the path for the cooling fluid is provided for every color in series.

Concretely, with respect to the red light, the outflow part of the divergence tank 464 is connected to the inflow part of the exit side polarizing plate cooling tube 4633R, the outflow part of the exit side polarizing plate cooling tube 4633R is connected to the inflow part of the liquid crystal panel cooling tube 4631R, the outflow part of the liquid crystal panel cooling tube 4631R is connected to the inflow part of the incident side polarizing plate cooling tube 4632R and the outflow part of the incident side polarizing plate cooling tube 4632R is connected to the inflow part of the confluence tank 465. That is to say, the exit side polarizing plate cooing tube 4633R, the liquid crystal panel cooling tube 4631R and the incident side polarizing plate cooling tube 4632R are provided in series in this order from the divergence tank 464 to the confluence tank 465. Similarly, with respect to the green light, the exit side polarizing plate cooing tube 4633G, the liquid crystal panel cooling tube 4631G and the incident side polarizing plate cooling tube 4632G are provided in series in this order from the divergence tank 464 to the confluence tank 465. As for the blue light, the exit side polarizing plate cooing tube 4633B, the liquid crystal panel cooling tube 4631B and the incident side polarizing plate cooling tube 4632B are also similarly provided in series in this order from the divergence tank 464 to the confluence tank 465.

The cooling fluid diverges into three paths in the divergence tank 464. The diverged cooling fluid for the respective colors first flows in the exit side polarizing plate cooling tubes 4633R, 4633G and 4633B, then flows in the liquid crystal panel cooling tubes 4631R, 4631G and 4631B, and finally, flows in the incident side polarizing plate cooling tubes 4632R, 4632G and 4632B. The cooling fluid flowing in the respective device cooling tubes along the peripheries of the respective devices allows the respective devices to be cooled and the cooling fluid flowing in the respective device cooling tubes to rise in temperature. In the modification, three device cooling tubes for every color are provided in series, so that the temperature of the cooling fluid in flowing into the cooling tubes (the entrance temperature) is lowest in the exit side polarizing plate cooling tube 4633R, 4633G and 4633B on the upstream side, second lowest in the liquid crystal panel cooling tubes 4631R, 4631G and 4631B and comparatively high in the incident side polarizing plate cooling tubes 4632R, 4632G and 4632B on the lower stream side. The cooling fluid then comes into confluent in the confluence tank 465 to be cooled by radiation of heat in the radiator 466 (refer to FIG. 3) described before. The cooling fluid having decreased in temperature is supplied to the divergence tank 464 again.

In the liquid crystal panels 441R, 441G and 441B, luminous flux is partially absorbed by optical absorption of the liquid crystal layers as well as data lines and scanning lines formed on a driving substrate, a black matrix formed on an opposite substrate or the like. Luminous flux incident to the incident side polarizing plate 442 has been converted into substantially one kind of polarized light by means of the polarization converting device 414 (refer to FIG. 1) on the upstream side. The incident side polarizing plate 442 transmits most of the luminous flux, so that absorption of the luminous flux is comparatively little. On the other hand, a polarizing direction of the luminous flux incident to the exit side polarizing plate 443 has been modulated according to image information. The absorption of the luminous flux in the exit side polarizing plate 443 is generally much more than that of the incident side polarizing plate 442.

The calorific value of the optical apparatus 44 tends to become higher in order from the incident side polarizing plate, the liquid crystal panel and the exit side polarizing plate (the incident side polarizing plate<the liquid crystal panel<the exit side polarizing plate).

In the modification in FIG. 16, every three device cooling tubes for the respective colors are provided in series in the paths for the cooling fluid. This enables a piping space to be miniaturized more than the case that the nine device cooling tubes are all provided in parallel.

Further, the exit side polarizing plate 443 having a comparatively large calorific value is first supplied with the cooling fluid, so that the exit side polarizing plate 443 is certainly cooled.

The arrangement is not limited to the above although the device cooling tubes are provided in series from the upstream side in order from the device cooling tube having a largest calorific value in the above example. The device cooling tubes may be provided in series from the upstream side in order from the device cooling tube having a smallest calorific value or in another order. The order of arrangement is determined in accordance with a difference in calorific value between plural devices, a cooling performance of the device cooling tube or such.

Further, the plural device cooling tubes are not limited to be provided all in series for every color. Only a part of the device cooling tubes may be provided in series as described below.

Figure 17:
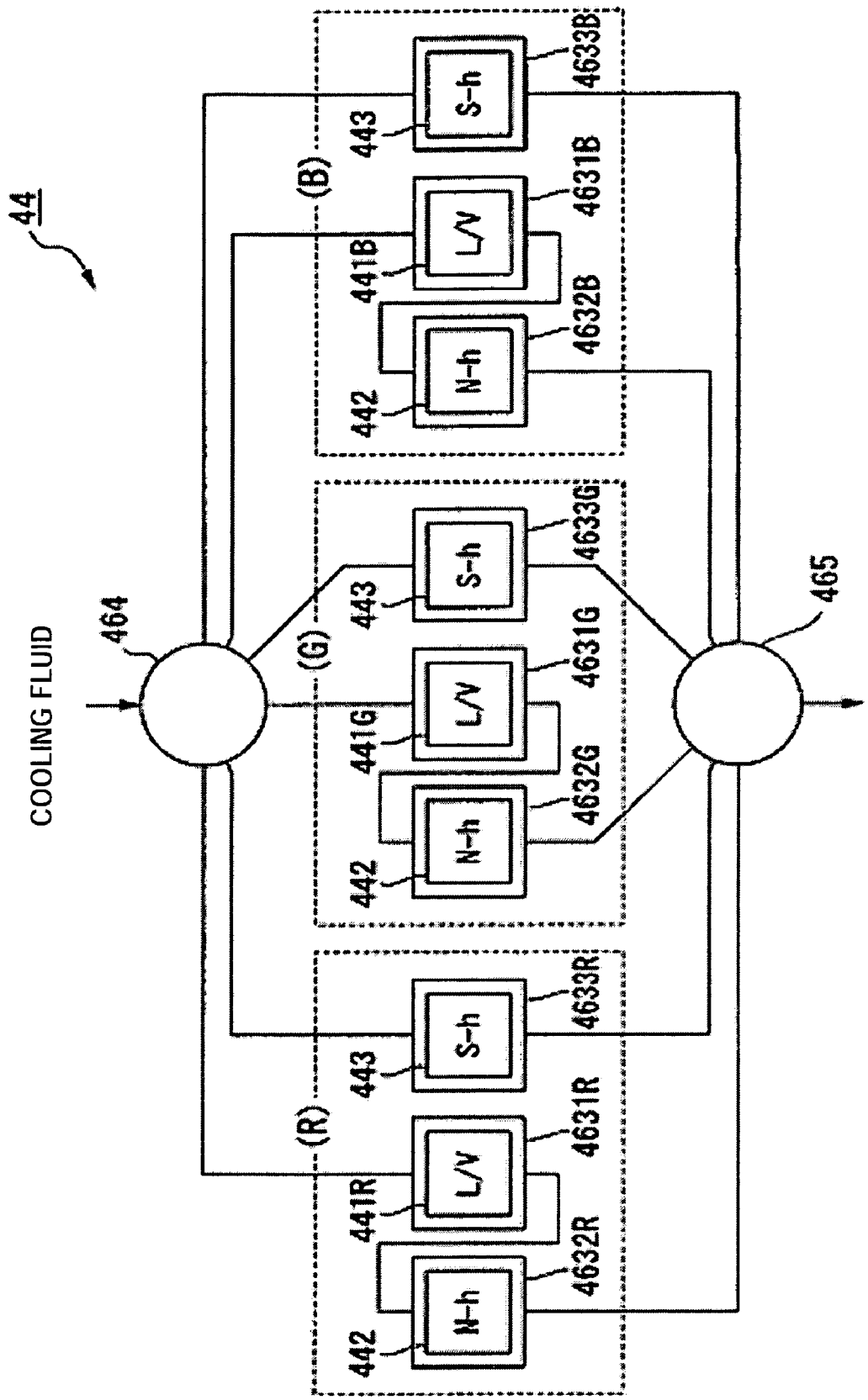
FIG. 17 illustrates another modification of the piping system.

FIG. 17 illustrates another modification of the piping system. Same reference signs and numerals are given to components common with those of FIG. 15.

In the modification in FIG. 17, the device cooling tubes (4631R, 4632R, 4633R, 4631G, 4632G, 4633G, 4631B, 4632B and 4633B) are respectively provided for the totally nine optical devices including three liquid crystal panels 441R, 441G and 441B, three incident side polarizing plates 442 and three exit side polarizing plates 443 of the optical apparatus 44 while the path for the cooling fluid is provided partially in series for every color.

Concretely, with respect to the red light, the liquid crystal panel cooling tube 4631R and the incident side polarizing plate cooling tube 4632R are provided in series in this order from the divergence tank 464 to the confluence tank 465 while the exit side polarizing plate cooing tube 4633R is provided in parallel to the above. That is to say, the outflow part of the divergence tank 464 is connected to the inflow part of the liquid crystal panel cooling tube 4631R, the outflow part of the liquid crystal panel cooling tube 4631R is connected to the inflow part of the incident side polarizing plate cooling tube 4632R and the outflow part of the incident side polarizing plate cooling tube 4632R is connected to the inflow part of the confluence tank 465. On the other hand, the outflow part of the divergence tank 464 is connected to the inflow part of the exit side polarizing plate cooling tube 4633R and the outflow part of the exit side polarizing plate cooling tube 4633R is connected to the inflow part of the confluence tank 465. Similarly, with respect to the green light, the liquid crystal panel cooling tube 4631G and the incident side polarizing plate cooling tube 4632G are provided in series in this order from the divergence tank 464 to the confluence tank 465 while the exit side polarizing plate cooing tube 4633G is provided in parallel to the above. As for the blue light, the liquid crystal panel cooling tube 4631B and the incident side polarizing plate cooling tube 4632B are also similarly provided in series in this order while the exit side polarizing plate cooing tube 4633B is provided in parallel to the above.

The cooling fluid diverges into every two paths for the respective colors, namely, six paths in total, in the divergence tank 464. The diverged cooling fluid for the respective colors first flows into the liquid crystal panel cooling tubes 4631R, 4631G and 4631B and the exit side polarizing plate cooling tubes 4633R, 4633G and 4633B. The cooling fluid having flown in the liquid crystal panel cooling tubes 4631R, 4631G and 4631B then flows in the incident side polarizing plate cooling tubes 4632R, 4632G and 4632B, and after the above, flows to the confluence tank 465. On the other hand, the cooling fluid for the respective colors having flown in the exit side polarizing plate cooling tubes 4633R, 4633G and 4633B flows to the confluence tank 465 as it is from the exit side polarizing plate cooling tubes 4633R, 4633G and 4633B. The cooling fluid flowing in the respective device cooling tubes along the peripheries of the respective devices allows the respective devices to be cooled and the cooling fluid flowing in the respective device cooling tubes to rise in temperature. In the modification, the temperature of the cooling fluid in flowing into the cooling tubes (the entrance temperature) is comparatively low in the liquid crystal panel cooling tubes 4631R, 4631G and 4631B on the upstream side and the exit side polarizing plate cooling tubes 4633R, 4633G and 4633B and comparatively high in the incident side polarizing plate cooling tubes 4632R, 4632G and 4632B. Further, the calorific value of the exit side polarizing plate 443 is highest among the calorific values of the other devices 443, as described above. Therefore, the temperature of the cooling fluid in flowing out the cooling tubes (the exit temperature) is comparatively high in the exit side polarizing plate cooling tube 4633R, 4633G and 4633B while the exit temperature in the liquid crystal panel cooling tubes 4631R, 4631G and 4631B is comparatively low. Accordingly, in the modification in FIG. 17, the entrance temperature in the incident side polarizing plate cooling tubes 4632R, 4632G and 4632B is lower than the case of the above modification shown in FIG. 16. The cooling fluid having flown the peripheries of the respective devices comes into confluent in the confluence tank 465 to be cooled by radiation of heat in the radiator 466 (refer to FIG. 3) described before. The cooling fluid having decreased in temperature is supplied to the divergence tank 464 again.

In the modification shown in FIG. 17, two device cooling tubes are provided in series for every color while another device cooling tube is provided in parallel to the above. This enables a piping space to be miniaturized more than the case of a structure that all of the nine device cooling tubes are provided in parallel.

Further, the cooling paths are provided for the liquid crystal panels 441R, 441G and 441B and the incident side polarizing plate 442 in parallel to the cooling path for the exit side polarizing plate 443 having a high calorific value. This allows heat of the exit side polarizing plate 443 to be prevented from influencing on the other devices, so that the liquid crystal panels 441R, 441G and 441B and the incident side polarizing plate 442 are effectively cooled.

In the modifications shown in FIGS. 15, 16 and 17, the respective cooling structures for the three colors of red (R), green (G) and blue (B) are same. The structures, however, may be different for the respective colors. For example, it is possible to use the structures in FIG. 16 or 17 for the red light and the blue light and use the structure in FIG. 15 or 17 for the green light. Another combination also can be applied.

The green light generally has comparatively high luminous intensity, and therefore, an optical device for the green light easily rises in temperature. Accordingly, the cooling structure with high cooling effectiveness is used for the green light while the simple cooling structures are used for the red light and the blue light in order to miniaturize a piping space and to efficiently cool the devices.

Moreover, in the modifications shown in FIGS. 15, 16 and 17, the paths for the cooling fluid diverges in the divergence tank 464 into at least three in accordance with the three colors of red, green and blue, but the invention is not limited to the above. For example, the divergence tank 464 may have a structure that the path of the cooling fluid diverges into a system for the red light and the blue light and a system for the green light. In this case, the cooling structures for the red light and the blue light are provided in series while the cooling structure for the green light is provided in parallel to the above, for example, for the purpose of miniaturizing a piping space and efficiently cooling the devices, similarly to the above.

First connecting structure of frame members

Now, a connecting structure of frame members used for the above-mentioned holding frames of the respective devices of the liquid crystal panel 441, the incident side polarizing plate 442 and the exit side polarizing plate 443 (the liquid crystal panel holding frame 445, the incident side polarizing plate holding frame 446 and the exit side polarizing plate holding frame 447) and a method of manufacturing the device holding frames will be described.

In the following description, "frame members 12 and 13" (refer to FIG. 18) correspond to the liquid crystal panel holding frames 445 (the frame member 4451 and the frame member 4452), the incident side polarizing plate holding frames 446 (the frame member 4461 and the frame member 4462) and the exit side polarizing plate holding frames 447 (the frame member 4471 and the frame member 4472) (refer to FIGS. 4, 9, 10 and 11).

Similarly, "a cooling tube 14" corresponds to the device cooling tubes 463 (the liquid crystal panel cooling tube 4631R, the incident side polarizing plate cooling tube 4632R and the exit side polarizing plate cooling tube 4633R).

Similarly, "an optical device 11" corresponds to the liquid crystal panels 441R, 441G and 441B, the incident side polarizing plate 442 and the exit side polarizing plate 443.

Figure 18:
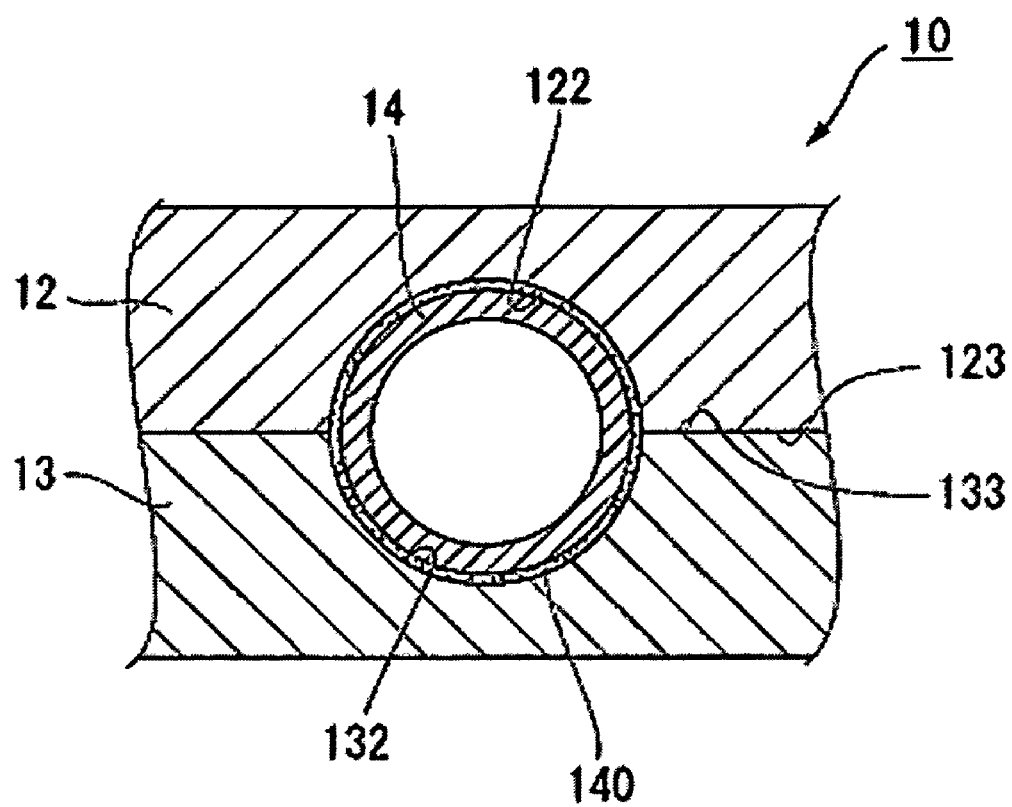
FIG. 18 is a sectional view of a part of a frame member in a first connecting structure.

As shown in FIG. 18, the frame member 12 and the frame member 13 are provided oppositely with respect to the cooling tube 14. The frame member 12 and the frame member 13 are respectively formed with grooves 122 and 132 for housing the cooling tube. The grooves 122 and 132 of the respective frame members 12 and 13 and the cooling tube 14 have the almost same outlines (a semicircular cross section) so as to be assembled each other. The diameter of the grooves 122 and 132 is formed almost as large as or a little larger than that of the cooling tube 14. An inner diameter of the grooves 122 and 132 is formed to be the outer diameter of the cooling tube 14 plus a tolerance, for example. A gap between the grooves 122 and 132 and the cooling tube 14, the gap being formed in assembly, is filled with a thermally conductive material 140.

As the thermally conductive material 140, preferably used is a thermally conductive material formed from a member having high thermal conductivity. Concretely, a resin material in which a metal material is mixed, a resin material in which a carbon material is mixed or hot melt, for example, is used. The thermal conductivity of the thermally conductive material 140 is preferably 3 W/(m·K) or more, more particularly, 5 W/(m·K) or more. The thermal conductivity of hot melt is generally 5 W/(m·K) or more. Some of the resin material in which a metal material or a carbon material is mixed has the thermal conductivity of 3 W/(m·K) or more and some of the resin material has the thermal conductivity of 10 W/(m·K) or more. As an example, proposed are D2 (a registered trademark) (LCP resin+a thermally conductive material, 15 W/(m·K), thermal expansion of $10 \times 10^{-6}$/K) and RS007 (a registered trademark) (PPS resin+a thermally conductive material, 3.5 W/(m·K), thermal expansion of $20 \times 10^{-6}$/K), which are made by Cool Polymers Inc.

The frame member 12 and the frame member 13 are connected in at least one kind of ways of mechanical connection such as connection by means of a screw, adhesion, welding and insertion. A simple connecting way is preferably used for the purpose of reducing a cost and miniaturization. The frame member 12 and the frame member 13 may be arranged so that adhesion force of the thermally conductive material 140 would contribute to get at least a part of connection force between the frame member 12 and the frame member 13.

In the embodiment, the respective frame members 12 and 13 and the cooling tube 14 are directly and thermally connected at a place where the grooves 122 and 132 of the respective frame members 12 and 13 are in contact with the cooling tube 14 while the both of the above are indirectly and thermally connected via the thermally conductive material 140 at a place where a gap is formed. That is to say, the thermally conductive material 140 complements thermal transfer between the frame members 12 and 13 and the cooling tube 14, and thereby, the thermal transfer between the frame members 12 and 13 and the cooling tube 14 is improved. Accordingly, the cooling fluid flowing in the cooling tube 14 can be used for effectively cooling the optical devices in contact with the frame members 12 and 13. Further, in the structure that the cooling tube 14 is provided in the frame bodies for holding the optical devices (the frame members 12 and 13), a risk of a fluid leak is small since a connection part for forming a path for the cooling fluid is comparatively small while piping resistance is small since a formed flow path is even and smooth in the flowing direction. Especially in the embodiment, disturbance in the flow is small since the shape of the cross section of the cooling tube 14 is kept to be a substantial circle.

First Manufacturing Method of a Device Holding Frame

Now, a manufacturing method of a device holding frame formed from the frame members 12 and 13 will be described.

FIG. 19 illustrates an example of a method of manufacturing the device holding frame in FIG. 18. The manufacturing method includes a groove forming process, a connecting process and a filling process. In the embodiment, the filling process is included in the connecting process.

Figure 19A:
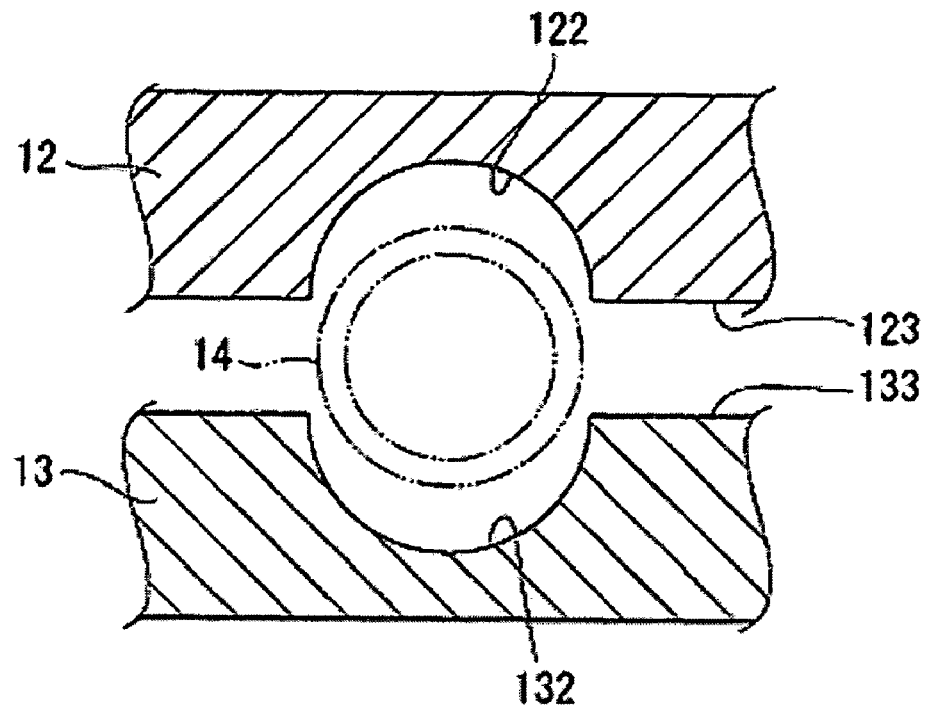
FIG. 19 illustrates a first example of a method of manufacturing a device holding frame.

First, in groove forming process, grooves 122 and 132 having a substantially semicircular or substantially U-shaped cross section for housing the cooling tube are formed on respective surfaces 123 and 133 of the pair of frame members 12 and 13, the surfaces being opposed to each other, as shown in FIG. 19A. In the process, casting (such as die casting) or forging (such as cold/hot forging) is used to form the frame member 12 (13) including the groove 122 (132) into one body. In casting, a melted material is poured into a mold in a predetermined shape to be set in order to get the frame member in a desirable shape, for example. In forging, a material member is sandwiched between a set of molds to compress the molds in order to get the frame member in a desirable shape, for example. Using casting (such as die casting) and forging (such as cold/hot forging) allows the frame members 12 and 13 in the above shape to be formed easily and at low cost and to be also used preferably for a small-sized object. In addition, the shape of the frame members 12 and 13 is simple, so that they can be formed easily and at low cost even in the case of using a cutting process.

Figure 19B:
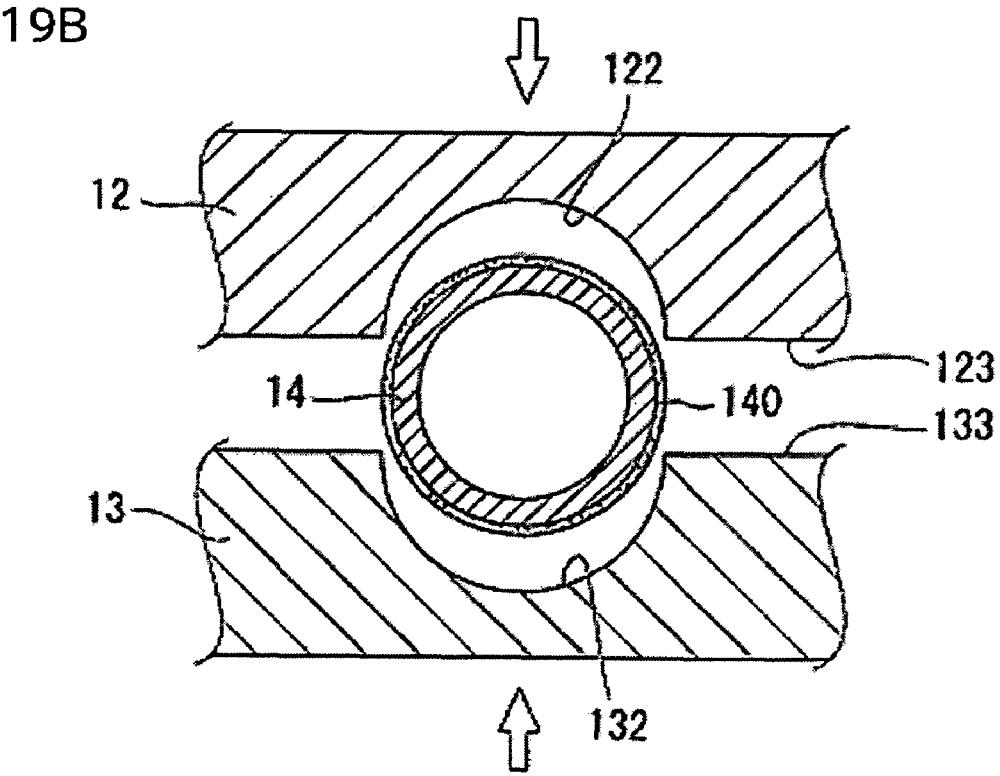
Figure 20:
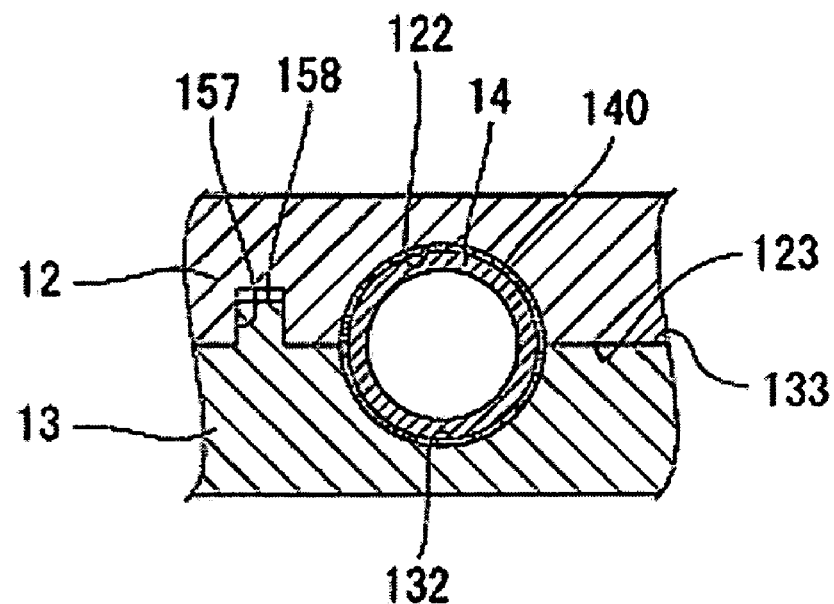
FIG. 20 illustrates an example of connection of a plate member.

In the connecting process (the filling process), the frame member 12 and the frame member 13 are arranged to be opposed to each other for housing the cooling tube 14 in the respective grooves 122 and 132, as shown in FIG. 19B. In this case, a concave 157 and a convex 158, which are for positioning, may be provided in the frame members 12 and 13 as shown in FIG. 20 so that assembling the concave 157 and the convex 158 would allow two-dimensional relative positions of the frame member 12 and the frame member 13 to be positioned. Before housing the cooling tube 14, the thermally conductive material 140 is applied to inner surfaces of the grooves 122 and 132 and/or an outer surface of the cooling tube 14. Various kinds of method such as spin coating, spray coating, roll coating, die coating, dip coating and a droplet jet can be used for applying the thermally conductive material 140.

Figure 21:
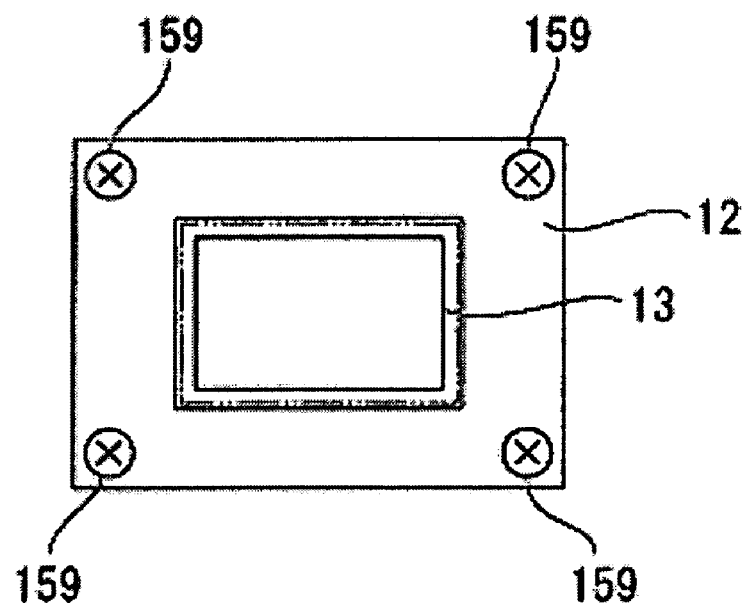
FIG. 21 illustrates connection of a plate member by means of a screw.

After applying the thermally conductive material 140, external force is added so that the opposing surface 123 of the frame member 12 would closely contact with the opposing surface 133 of the frame member 13 with the cooling tube 14 being housed in the respective grooves 122 and 132, as shown in FIG. 19B. This allows the gap between the grooves 122 and 132 of the respective frame members 12 and 13 and the cooling tube 14 to be filled with the thermally conductive material 140 (refer to FIG. 18). The frame member 12 is then connected to the frame member 13. The connection can be carried out in at least one kind of ways of mechanical connection such as connection by means of a screw 159 shown in FIG. 21, adhesion, welding and insertion. Connection in ways other than adhesion can be omitted when the adhesion force of the thermally conductive material 140 is large enough.

In the connection, the thermally conductive material 140 is softened or made fluid in accordance with necessity. In the case that the thermally conductive material 140 is thermally plastic, for example, the thermally conductive material 140 is heated in the connection. In this case, the frame members 12 and 13 are heated via an object (a jig) for holding the frame members 12 and 13 in the connection or a fluid of high temperature is let flow in the cooling tube 14, foe example. Softening or flowing of the thermally conductive material 140 in connecting the frame members 12 and 13 allows the gap between the grooves 122 and 132 of the frame member 12 and 13 and the cooling tube 14 to be filled with the thermally conductive material 140 all over the area of the gap. The device holding frame having the structure that the pair of frame members 12 and 13 are provided oppositely with respect to the cooling tube 14 is thus manufactured.

As described above, in the method of manufacturing the device holding frame 10 in the embodiment, using the thermally conductive material 140 allows the respective frame members 12 and 13 and the cooling tube 14 to be thermally connected without enlarging the diameter of the cooling tube 14. Omitting a process of enlarging the diameter of the cooling tube 14 contributes to great shortening of time for manufacture and enables the manufacturing method to be preferably applied to the cooling tube 14 having a small diameter. Therefore, in accordance with the manufacturing method, it is possible to achieve reduction in cost and miniaturization of the device holding frame 10 to be manufactured.

Further, a gap between the respective grooves 122 and 132 of the frame members 12 and 13 and the cooling tube 14 may be filled (supplied) with the thermally conductive material 140 after connecting the pair of frame members 12 and 13.

The thermally conductive material 140 preferably has elasticity in a range of temperature in using the cooling plates (the frame members 12 and 13). The elastic thermally conductive material 140 expands and contracts in accordance with a change of the gap between the frame members 12 and 13 and the cooling tube 14 due to thermal deformation or the like, so that thermal connection between the frame members 12 and 13 and the cooling tube 14 can be stably maintained.

FIG. 22 illustrates a modification of the manufacturing method in FIG. 19. Components having the same function as that of the components having been described are marked with the same reference numeral and signs and description thereof is omitted or simplified.

In the modification in FIG. 22, an auxiliary groove 160 for at least temporally housing the thermally conductive material 140 is formed on the opposing surface 133 of the frame member 13.

Figure 22A:
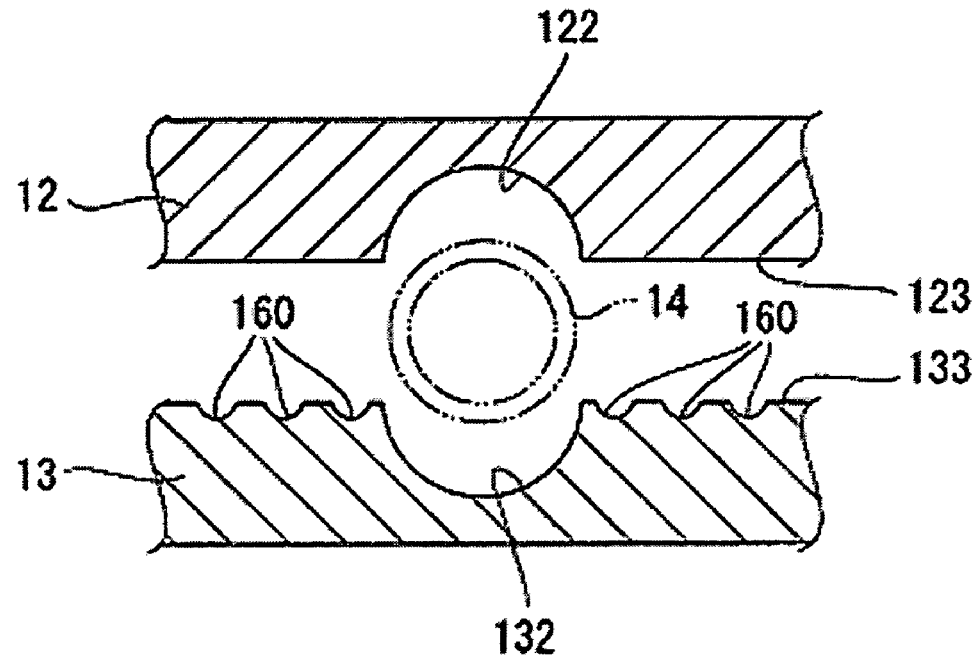
FIG. 22 illustrates a modification of a manufacturing method in FIG. 19.

That is to say, in the groove forming process, the groove 122 for housing the cooling tube 14 is formed on the opposing surface 123 of one frame member 12 while the groove 132 for housing the cooling tube 14 and the auxiliary groove 160 provided adjacently to the groove 132 are formed on the opposing surface 133 of the other frame member 13 (FIG. 22A). The auxiliary groove 160 is formed on the opposing surface 133 of the frame member 13 substantially in parallel to the groove 132 on the both outer sides of the groove 132. The auxiliary groove 160 is provided in plural numbers so as to be separated from each other. The shape and number of the auxiliary groove 160 are properly determined in accordance with the material properties of the thermally conductive material 140. Using casting (such as die casting) or forging (such as cool/hot forging) enables the frame member 13 even in such a shape to be formed easily and at a low cost. A similar groove may be also provided on the opposing surface 123 of the frame member 12.

Figure 22B:
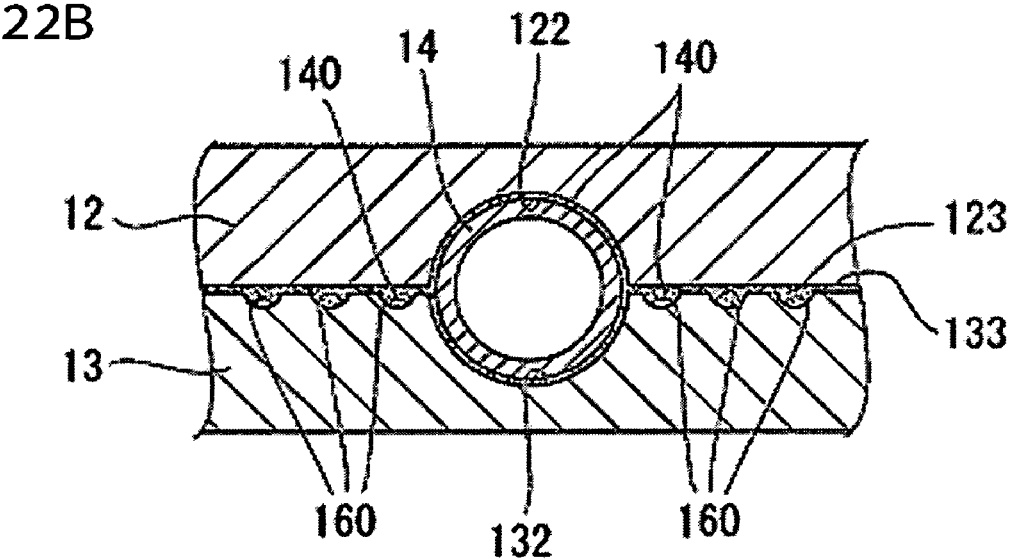

In the connecting process (the filling process), the thermally conductive material 140 is applied to the inner surface of the grooves 122 and 132 and/or the outer surface of the cooling tube 14 in advance of housing of the cooling tube 14 in the grooves 122 and 132. Then, after the thermally conductive material 140 is applied, external force is added so that the opposing surface 123 of the frame member 12 would closely contact with the opposing surface 133 of the frame member 13 with the cooling tube 14 being housed in the respective grooves 122 and 132. The gap between the grooves 122 and 132 of the respective frame members 12 and 13 and the cooling tube 14 is thus filled with the thermally conductive material 140 (FIG. 22B). The thermally conductive material 140 is softened or made fluid by heating or the like at that time in accordance with necessity. Redundancy of the thermally conductive material 140 flows into the auxiliary groove 160 to be stored. Then, the frame member 12 is connected to the frame member 13.

In the embodiment, the auxiliary groove 160 is formed on the opposing surface 133 of the frame member 13, so that the redundancy of the thermally conductive material 140 is stored in the auxiliary groove 160. Providing an escape for the thermally conductive material 140 allows the thermally conductive material 140 to be easily spread evenly, and thereby, the thermally conductive material 140 to be provided more certainly all over the area of the gap between the grooves 122 and 132 of the frame members 12 and 13 and the cooling tube 14. The thermally conductive material 140 provided in the auxiliary groove 160 (or in the gap between the opposing surfaces 123 and 133) has a function of improving thermal connection between the frame members 12 and 13.

In the case that the thermally conductive material 140 has adhesion force, enlarging the area of arranging the thermally conductive material 140 allows the area of adhesion between the frame member 12 and the frame member 13 to be enlarged, so that connection force between the frame member 12 and the frame member 13 through the thermally conductive material 140 is improved. This, as a result, enables connection in the other ways such as connection by means of a screw or such to be omitted.

The thermally conductive material 140 may have fluidity in a range of temperature in using the cooling plates (the frame members 12 and 13). In this case, when the volume of the gap between the grooves 122 and 132 of the frame members 12 and 13 and the cooling tube 14 varies due to thermal deformation or the like, the thermally conductive material 140 properly moves between the gap and the auxiliary groove 160. This allows a filling condition of the thermally conductive material 140 in the gap to be kept, so that thermal connection between the frame members 12 and 13 and the cooling tube 14 is stably maintained. In this case, it is preferable to take steps for preventing the thermally conductive material 140 from leaking outside. For example, an anaerobic thermally conductive material may be used to be cured at a part contacting with the air outside and to keep fluidity inside thereof. Otherwise, it may be possible to provide inside a thermally conductive material having fluidity in the range of temperature in using and outside another thermally conductive material, which is to be cured.

Figure 23:
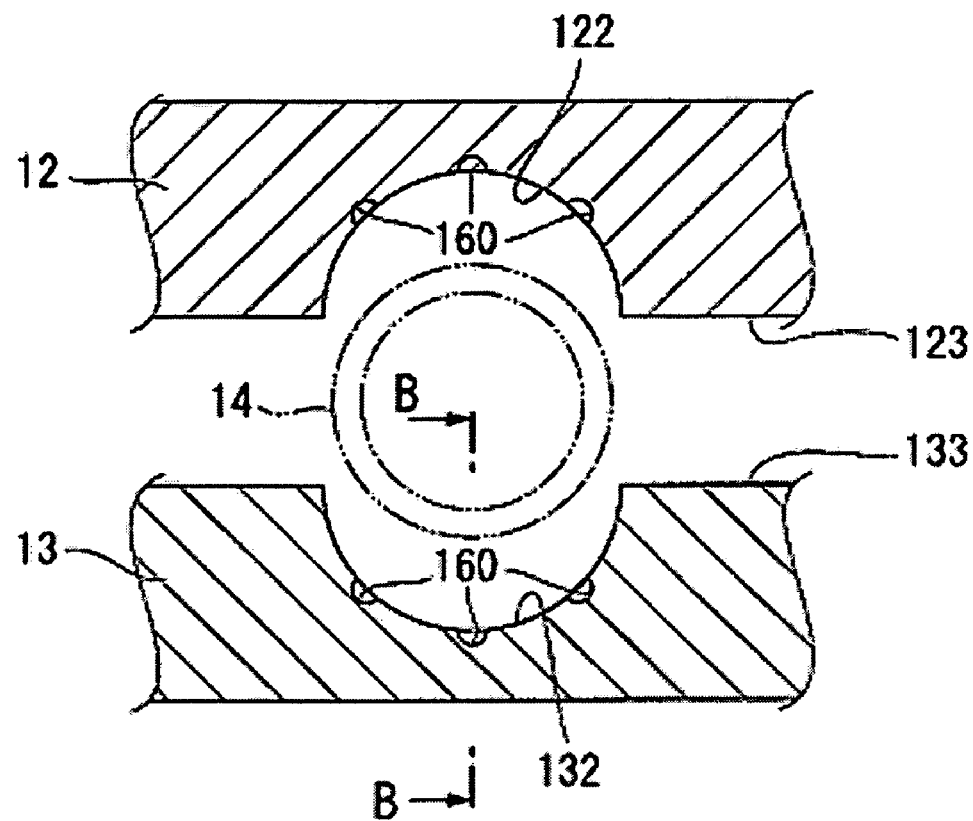
FIG. 23 illustrates an auxiliary groove in another embodiment.
Figure 23:
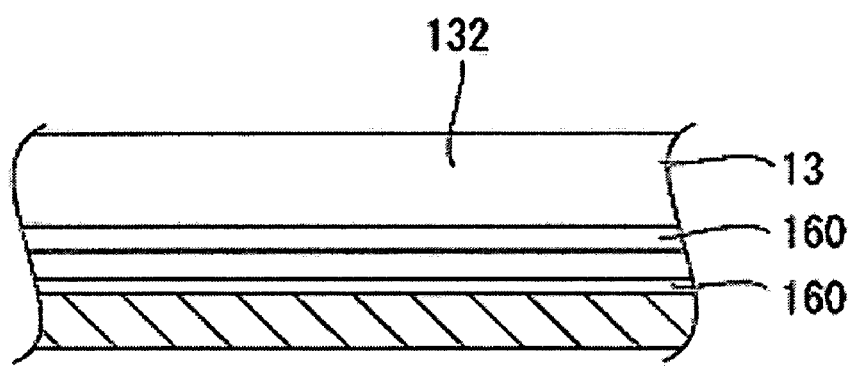
Figure 24:
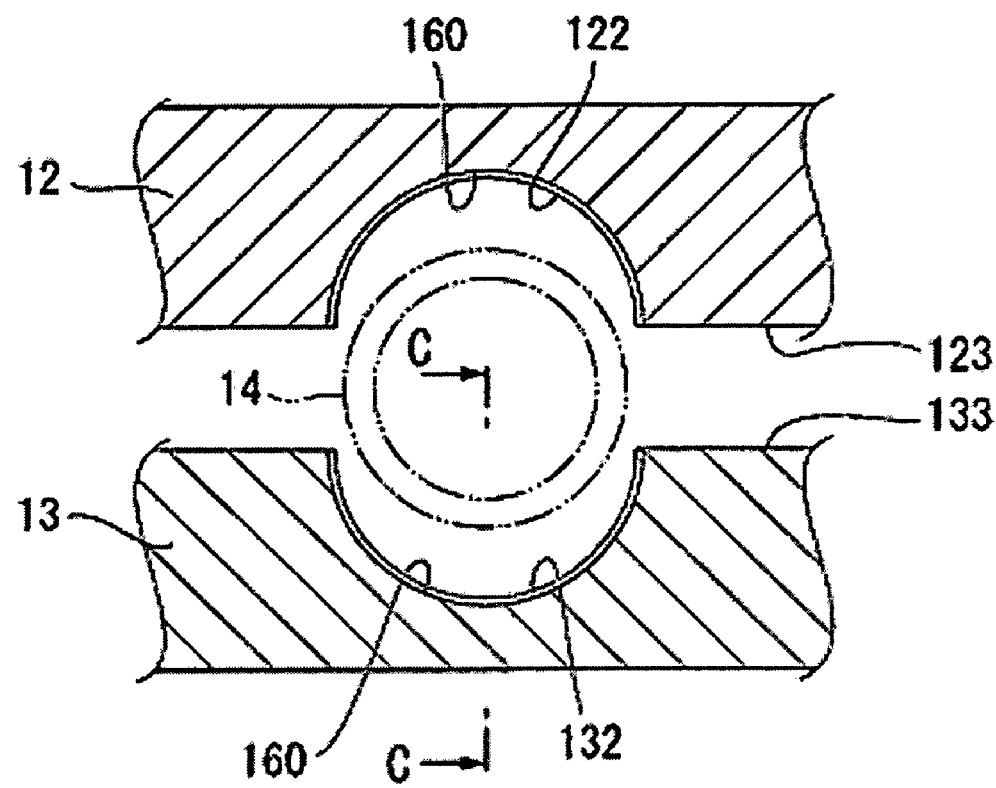
FIG. 24 illustrates an auxiliary groove in another embodiment.
Figure 24:
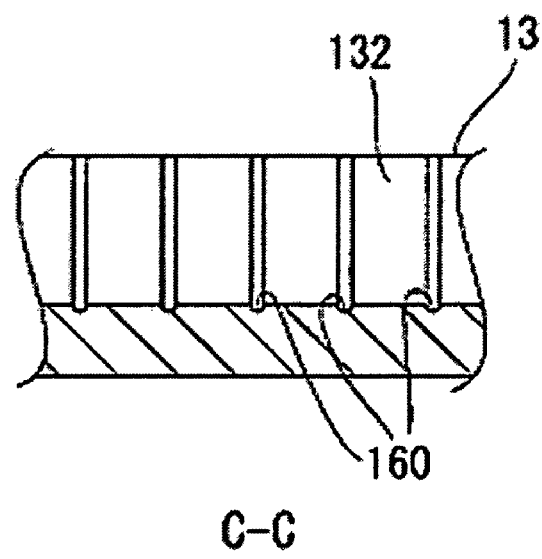

FIGS. 23 and 24 illustrate other embodiments of the auxiliary groove 160.

In an embodiment in FIG. 23, the auxiliary groove 160 is formed in the inner surfaces of the respective grooves 122 and 132 of the frame members 12 and 13 so as to extend in the axial direction thereof. Further, the auxiliary groove 160 is provided in plural numbers so as to be separated from each other in its circumferential direction.

In an embodiment in FIG. 24, the auxiliary groove 160 is formed in the inner surfaces of the respective grooves 122 and 132 of the frame members 12 and 13 so as to extend in the circumferential direction thereof. Further, the auxiliary groove 160 is provided in plural numbers so as to be separated from each other in the axial direction of the grooves 122 and 132. In FIG. 24, the auxiliary groove 160 may be formed so that the depth thereof would be gradually changed to become smaller from the bottom to the top of the groove 122 (132).

Using casting (such as die casting) or forging (such as cool/hot forging) enables the frame members 12 and 13 even in such a shape to be formed easily and at low cost.

In the embodiments in FIGS. 23 and 24, the auxiliary groove 160 is formed in the inner surface of the respective grooves 122 and 132 of the frame members 12 and 13. Accordingly, the redundancy of the thermally conductive material 140 easily moves to the auxiliary 160 in filling of the thermally conductive material 140. This results in easy and even spread of the thermally conductive material 140, and thereby, the thermally conductive material 140 is provided more certainly all over the area of the gap between the grooves 122 and 132 of the frame members 12 and 13 and the cooling tube 14.

The auxiliary groove 160 may be provided in the both of the grooves 122 and 132 and the opposing surfaces 123 and 133 of the frame members 12 and 13.

Figure 25:
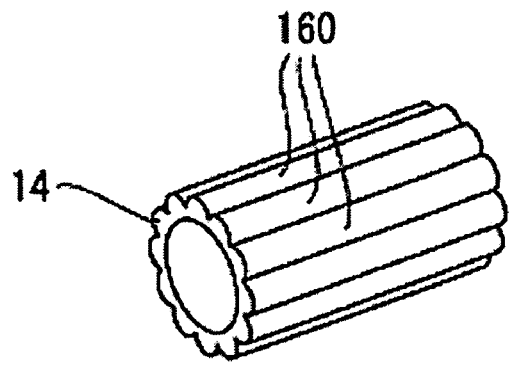
FIG. 25 illustrates an example of an auxiliary groove formed in a cooling tube.
Figure 26:
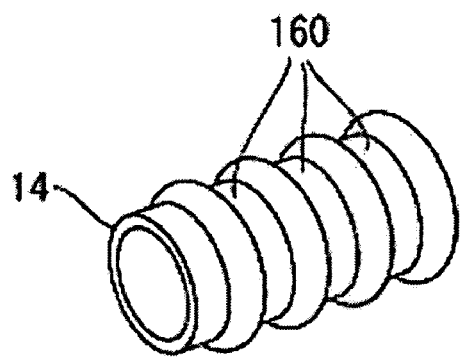
FIG. 26 illustrates an example of an auxiliary groove formed in a cooling tube.
Figure 27:
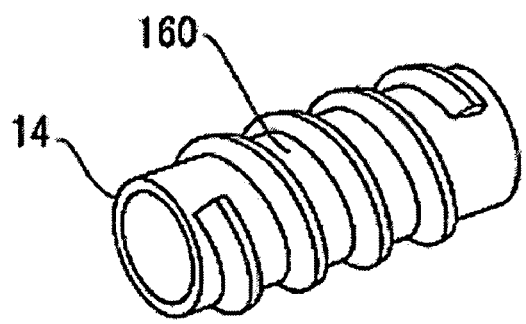
FIG. 27 illustrates an example of an auxiliary groove formed in a cooling tube.

FIGS. 25, 26 and 27 illustrate embodiments in which the auxiliary groove 160 is formed in the outer surface of the cooling tube 14.

In the embodiment in FIG. 25, the auxiliary groove 160 is formed in the outer surface of the cooling tube 14 so as to extend in the axial direction thereof. The auxiliary groove 160 is provided in plural numbers so as to be separated from each other in the circumferential direction of the cooling tube 14.

In the embodiment in FIG. 26, the auxiliary groove 160 is formed in the outer surface of the cooling tube 14 so as to extend in the circumferential direction thereof. The auxiliary groove 160 is provided in plural numbers so as to be separated from each other in the axial direction of the cooling tube 14.

In the embodiment in FIG. 27, the auxiliary groove 160 is formed into a spiral in the outer surface of the cooling tube 14.

In the embodiments in FIGS. 25, 26 and 27, the redundancy of the thermally conductive material 140 easily moves to the auxiliary 160 in filling of the thermally conductive material 140 since the auxiliary groove 160 is formed in the outer surface of the cooling tube 14. This results in easy and even spread of the thermally conductive material 140, and thereby, the thermally conductive material 140 is provided more certainly all over the area of the gap between the grooves 122 and 132 of the frame members 12 and 13 and the cooling tube 14.

Second Connection Structure of the Frame Member

Now, a second connection structure of the frame member and a corresponding method of manufacturing the device holding frame will be described. In the respective drawings, the size of the respective components is different from the actual size in accordance with the necessity for the purpose of recognition in the drawings. Components having the same function as that of the components having been described are marked with the same reference numeral and signs and description thereof is omitted or simplified.

Figure 28:
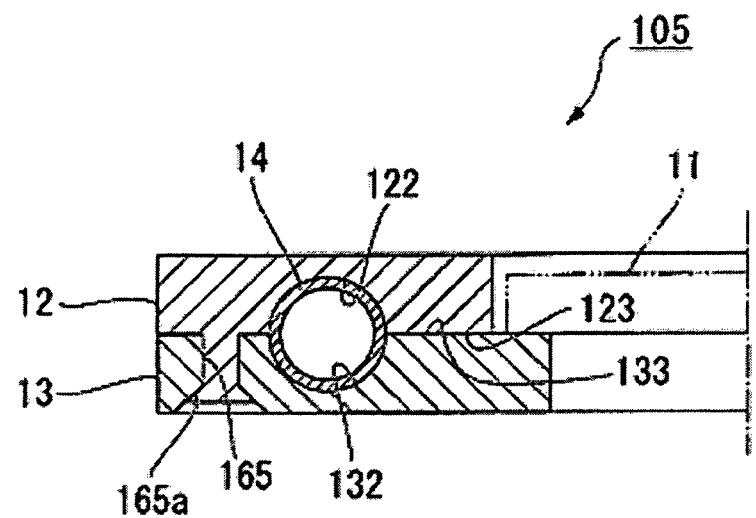
FIG. 28 is a sectional view of a part of a frame member in a second connecting structure.

FIG. 28 is a cross-sectional view of the device holding frame 105 having the connection structure in the embodiment. The device holding frame 105 is for holding the periphery of the optical device 11 and cooling the optical device 11, similarly to the device holding frame 10 in FIG. 18. The device holding frame 105 comprises the pair of frame members 12 and 13 for holding the optical device 11 and the cooling tube 14 held between the pair of frame members 12 and 13.

In the device holding frame 105 of the embodiment, one frame member 13 is formed in an insert molding process differently from the device holding frame 10 in FIG. 18.

For the frame member 13 (the first frame member), preferably used is a thermal conductor formed from a material having high thermal conductivity, that is, various kinds of metal such as aluminum (234 W/(m·K)), magnesium (156 W/(m·K)) or an alloy of the above (an aluminum alloy (about 100 W/(m·K)), low specific gravity magnesium alloy (about 50 W/(m·K)) or the like), for example. The frame 13 is not limited to be formed from a metal material but may be formed from another material (such as a resin material) having high thermal conductivity (5 W/(m·K) or more, for example).

On the other hand, for the frame member 12 (the second frame member), used is a resin material having a melting point lower than that of the frame member 13 and the cooling tube 14. For example, a resin material in which a metal material is mixed or a resin material in which a carbon material is mixed is used. The thermal conductivity of the resin material is preferably 3 W/(m·K) or more, more particularly, 5 W/(m·K) or more. Some of the resin material in which a metal material or a carbon material is mixed has the thermal conductivity of 3 W/(m·K) or more and some of the resin material has the thermal conductivity of 10 W/(m·K) or more. As an example, proposed are D2 (a registered trademark) (LCP resin+a thermally conductive material, 15 W/(m·K), thermal expansion of $10\times10^{-6}$/K) and RS007 (a registered trademark) (PPS resin+a thermally conductive material, 3.5 W/(m·K), thermal expansion of $20\times10^{-6}$/K), which are made by Cool Polymers Inc.

The cooling tube 14 is formed from a pipe or a tube, which has an annular cross section, for example, and which extends along a center axis thereof, and undergoes a bending-process so as to correspond to the planar shapes of the grooves 122 and 132 of the frame members 12 and 13. For the cooling tube 14, preferably used is a thermal conductor formed from a material having high thermal conductivity, that is, various kinds of metal such as aluminum (234 W/(m·K)), copper (398 W/(m·K)), stainless steel (16 W/(m·K) (austenitic)) or an alloy of the above, for example.

In a preferable combination of materials of the frame member 13 (the first frame member), the frame member 12 (the second frame member) and the cooling tube 14, thermal expansion of the materials is at the same degree among each other.

As an example, proposed is a combination of the frame member 13 and the cooling tube 14, which are made of copper (thermal expansion of $16.6\times10^{-6}$/K) or stainless steel (austenitic, thermal expansion of $13.6\times10^{-6}$/K), and the frame member 12 formed from the above-mentioned resin material having high thermal conductivity (thermal expansion of 10 to $20\times10^{-6}$/K).

On the opposing surface 133 of the frame member 13, provided are the groove 132 for housing the cooling tube 14 and a through-hole 165 used as an engaging portion. The through-hole 165 is formed in the vicinity of an opening provided on the side opposite to the opposing surface 133 with a tapered slant 165a so that the through-hole 165 would become wider toward the opening. An opening portion with a step may be provided instead of the tapered opening portion. The shape and number of the through-hole 165 can be optionally determined. The frame member 12 is connected to the frame member 13 by filling the through-hole 165 of the frame member 13 with a material forming the frame member 12 in the insert molding process of the frame member 12. The connection enables the frame members 12 and 13 and the cooling tube 14 to be thermally connected each other.

Second Manufacturing Method of a Device Holding Frame

Now, a manufacturing method of the device holding frame 105 will be described.

FIG. 29 illustrates an embodiment of a method of manufacturing the device holding frame 105. The manufacturing method includes a groove forming process and a connecting process.

Figure 29A:
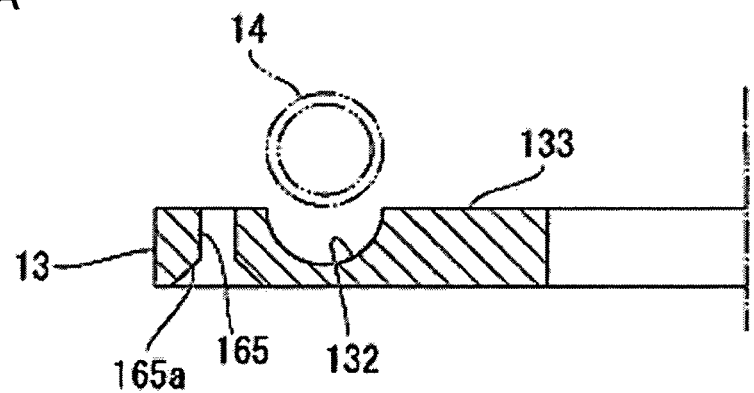
FIG. 29 illustrates a second example of a method of manufacturing a device holding frame.

First, in groove forming process, the groove 132 having a substantially semicircular or substantially U-shaped cross section for housing the cooling tube 14 and the through-hole 165 for connection are formed on the opposing surface 133 of the frame member 13 (the first frame member), as shown in FIG. 29A. The through-hole 165 has the tapered slant 165a in the vicinity of an opening provided on the side opposite to the opposing surface 133 so that the through-hole 165 would become wider toward the opening, as described above. In the process, casting (such as die casting) or forging (such as cold/hot forging) is used to form the frame member 13 including the groove 132 and the through-hole 165 into one body. In casting, a melted material is poured into a mold in a predetermined shape to be set in order to get the frame member in a desirable shape, for example. In forging, a material member is sandwiched between a set of molds to compress the molds in order to get the frame member in a desirable shape, for example. Using casting (such as die casting) and forging (such as cold/hot forging) allows the frame member 13 in the above shape to be formed easily and at low cost and to be also used preferably for a small-sized object.

Figure 29B:
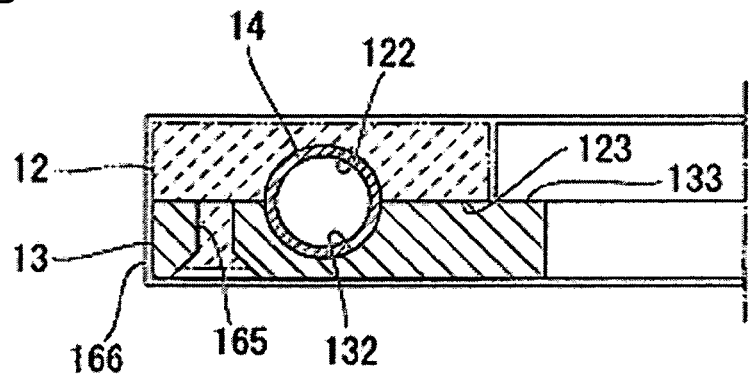

In the connecting process, the frame member 12 is formed in the insert molding process with the cooling tube 14 being housed in the groove 132 of the frame 13, as shown in FIG. 29B. That is to say, the cooling tube 14 is housed in the groove 132 of the frame member 13 while it is fixed in a mold 166 to supply (supply by a pour or injection, for example) the mold 166 with a melted material and set the material into the frame member 12 in a desirable shape.

In the forming process, the frame member 12 is formed so as to correspond to external shapes of the frame member 13 and the cooling tube 14, and thus, the groove 122 is formed in the opposing surface 123 of the frame member 12 so as to have an external part in the almost same shape as that of the cooling tube 14 (a semicircular cross section). The through-hole 165 of the frame member 13 is filled with a material forming the frame member 12, and thereby, engaged. As a result, the frame member 12 is held in close contact with the frame member 13 and the cooling tube 14 and the frame members 12 and 13 and the cooling tube 14 are thermally connected.

Further, in a combination of materials of the frame member 13 (the first frame member), the frame member 12 (the second frame member) and the cooling tube 14, thermal expansion of the materials is at the same degree among each other. This allows a gap between the respective frame members 12 and 13 and the cooling tube 14 due to a difference in thermal deformation to be prevented from being formed in curing and constructing the frame member 12 or after forming the frame member 12. Accordingly, the thermal connection thereof can be stably maintained.

As described above, the frame member 12 is formed on the periphery of the cooling tube 14 in insert molding in the embodiment. Accordingly, the frame member 12 is formed so as to correspond to the external shapes of the cooling tube 14 and the frame member 13, so that the frame members 12 and 13 and the cooling tube 14 can be in good contact with each other. Therefore, thermal transfer can be improved between the respective frame members 12 and 13 and the cooling tube 14 even in the case that the cooling tube 14 is small in size. Further, omitting a diameter enlarging process allows a complicated process such as cutting with special tools to become unnecessary. That is to say, in accordance with the manufacturing method, the device holding frame 105 can be manufactured at low cost and miniaturized.

In the device holding frame, the gap between the groove 132 of the frame member 13 and the cooling tube 14 is filled with a thermally conductive material for the purpose of enabling thermal transfer between the frame member 13 and the cooling tube 14 to be improved. For the thermally conductive material, preferably used is a thermal conductor having high thermal conductivity such as the above-mentioned resin material in which a metal material is mixed, the resin material in which a carbon material is mixed or hot melt, for example.

The filling of a thermally conductive material can be carried out by applying the thermally conductive material on the inner surface of the groove 132 of the frame member 13 and/or the outer surface of the cooling tube 14 in advance of housing of the cooling tube 14 in the groove 132 of the frame member 13, for example. Various kinds of method such as spin coating, spray coating, roll coating, die coating, dip coating and a droplet jet can be used for applying the thermally conductive material.

When the cooling tube 14 is housed in the grove 132 of the frame member 13 after applying the thermally conductive material, the frame member 13 and the cooling tube 14 are thermally connected directly in a place where the groove 132 of the frame member 13 is in contact with the cooling tube 14 while the both are thermally connected indirectly via the thermally conductive material in a gap generated therebetween. That is to say, the thermally conductive material complements heat transfer between the frame member 13 and the cooling tube 14, and thereby, the heat transfer between the frame member 13 and the cooling tube 14 is improved. In the case that the thermally conductive material has adhesion force, the force can be used for connection between the frame member 13 and the cooling tube 14.

In the connection, the thermally conductive material can be softened or made fluid in accordance with necessity. In the case that the thermally conductive material is thermally plastic, for example, the thermally conductive material is heated in the connection. In this case, heat in molding the frame member 12 is used or a fluid of high temperature is let flow in the cooling tube 14. Softening or flowing of the thermally conductive allows the gap between the groove of the frame member 13 and the cooling tube 14 to be filled with the thermally conductive material all over the area of the gap.

The thermally conductive material preferably has elasticity in a range of temperature in using the cooling plates (the frame members 12 and 13). The elastic thermally conductive material expands and contracts in accordance with a change of the gap between the frame members 12 and 13 and the cooling tube 14 due to thermal deformation or the like, so that thermal connection between the frame members 12 and 13 and the cooling tube 14 can be stably maintained.

Another Embodiment of a Device Holding Frame

Now, another embodiment of a device holding frame will be described. In the respective drawings, the size of the respective components is different from the actual size in accordance with the necessity for the purpose of recognition in the drawings. Components having the same function as that of the components having been described are marked with the same reference numeral and signs and description thereof is omitted or simplified.

Figure 30:
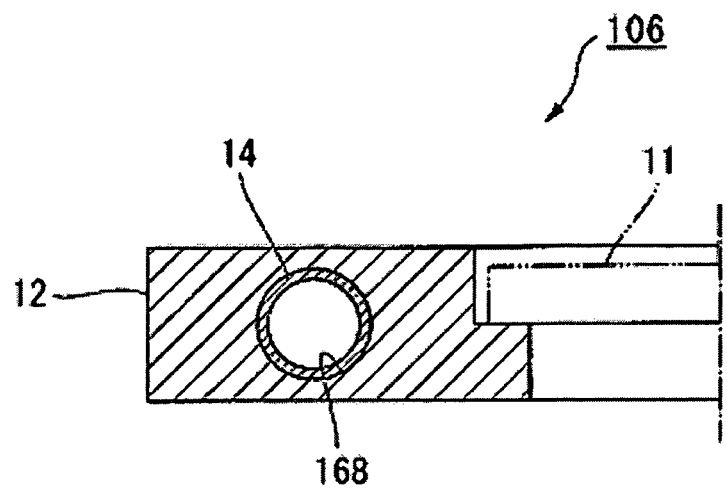
FIG. 30 illustrates the device holding frame in another embodiment.

FIG. 30 is a sectional view of a device holding frame 106 in the embodiment. The device holding frame 106 is for holding the periphery of the optical device 11 and cooling the optical device 11, similarly to the device holding frame 10 in FIG. 28. The device holding frame 106 comprises the frame member 12 for holding the optical device 11 and the cooling tube 14 provided in the frame member 12.

The device holding frame 106 in the embodiment is different from the device holding frame 10 in FIG. 28 in that one frame member 12 is formed on the periphery of the cooling tube 14 in insert molding.

For the frame member 12, preferably used is a thermal conductor formed from a material having high thermal conductivity, that is, various kinds of metal such as aluminum (234 W/(m·K)), magnesium (156 W/(m·K)) or an alloy of the above (an aluminum alloy (about 100 W/(m·K)), a low specific gravity magnesium alloy (about 50 W/(m·K)) or the like), for example. The frame 12 is not limited to be formed from a metal material but may be formed from another material (such as a resin material) having high thermal conductivity (5 W/(m·K) or more, for example).

The cooling tube 14 is formed from a pipe or a tube, which has an annular cross section, for example, and which extends along a center axis thereof, and undergoes a bending-process so as to correspond to the planar shapes of the grooves 122 and 132 of the frame members 12 and 13. For the cooling tube 14, preferably used is a thermal conductor formed from a material having high thermal conductivity, that is, various kinds of metal such as aluminum (234 W/(m·K)), copper (398 W/(m·K)), stainless steel (16 W/(m·K) (austenitic)) or an alloy of the above, for example.

In a preferable combination of materials of the frame member 12 and the cooling tube 14, the frame member 12 is lower in melting point than the cooling tube 14 while the frame member 12 is higher in thermal expansion than the cooling tube 14.

As an example, proposed are a combination of the frame member 12 made of an aluminum alloy (melting point of 580° C., thermal expansion of $22 \times 10^{-6}$/K) and the cooling tube 14 made of copper (melting point of 1083° C., thermal expansion of $16.6 \times 10^{-6}$/K) and a combination of the frame member 12 made of a low specific gravity magnesium alloy (melting point of 650° C., thermal expansion of $27 \times 10^{-6}$/K) and the cooling tube 14 made of copper (melting point of 1083° C., thermal expansion of $16.6 \times^{-6}$/K).

Forming the frame member 12 on the periphery of the cooling tube 14 in molding allows the frame member 12 and the cooling tube 14 to be thermally connected.

Third Manufacturing Method of a Device Holding Frame

Now, a manufacturing method of the device holding frame 106 will be described.

Figure 31:
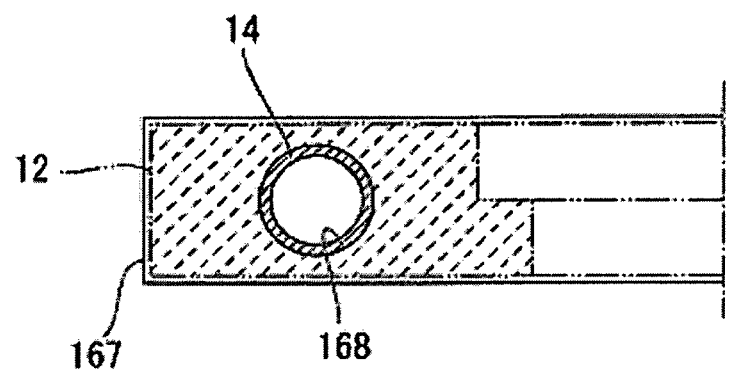
FIG. 31 illustrates a third example of a method of manufacturing a device holding frame.

FIG. 31 illustrates an embodiment of a method of manufacturing the device holding frame 106. The manufacturing method includes a molding process.

That is to say, as shown in FIG. 31, the frame member 12 is formed on the periphery of the cooling tube 14 in insert molding. Concretely, the cooling tube 14 is fixed in a mold 167 to supply the mold 167 with a melted material (supply by a pour or injection, for example) and to set the material for obtaining the frame member 12 in the desirable shape.

In the molding process, the frame member 12 is formed so as to correspond to the external shape of the cooling tube 14 while a hole 168 having an external part (a circular cross section) in the almost same shape as that of the cooling tube 14 is formed in the frame member 12. As a result, the frame member 12 and the cooling tube 14 are held in close contact with each other and the frame member 12 and the cooling tube 14 are thermally connected.

In the case of a combination of materials that the frame member 12 is higher in thermal expansion than the cooling tube 14, the frame member 12 is larger in contraction quantity than the cooling tube 14 in curing and contraction of the frame member 12. Accordingly, a gap is prevented from being formed between the frame member 12 and the cooling tube 14 and the both of the frame member 12 and the cooling tube 14 become in close contact certainly. That is to say, in a process of curing and contraction of the cooling tube 14 and the frame member 12, the cooling tube 14 is tightened in the hole 168 of the frame member 12 due to a difference in thermal deformation between the cooling tube 14 and the frame member 12. As a result, the thermal connection between the both of the frame member 12 and the cooling tube 14 are stably maintained.

As described above, the frame member 12 is formed so as to correspond to the external shape of the cooling tube 14 to be in good contact with the cooling tube 14 since the frame member 12 is formed on the periphery of the cooling tube 14 in insert molding in the embodiment. Accordingly, the heat transfer between the frame member 12 and the cooling tube 14 can be improved even in the case that the cooling tube 14 is small in size. Further, omitting a diameter enlarging process allows a complicated process such as cutting with special tools to become unnecessary. That is to say, in accordance with the manufacturing method, the device holding frame 106 can be manufactured at low cost and miniaturized.

For the frame member 12, used may be a resin material having a melting point lower than and thermal conductivity higher than those of the cooling tube 14. For example, a resin material in which a metal material is mixed, a resin material in which a carbon material is mixed may be used. The thermal conductivity of the resin material is preferably 3 W/(m·K) or more, more particularly, 5 W/(m·K) or more. Some of the resin material in which a metal material or a carbon material is mixed has the thermal conductivity of 3 W/(m·K) or more and some of the resin material has the thermal conductivity of 10 W/(m·K) or more. As an example, proposed are D2 (a registered trademark) (LCP resin+a thermally conductive material, 15 W/(m·K), thermal expansion of $10 \times 10^{-6}$/K) and RS007 (a registered trademark) (PPS resin+a thermally conductive material, 3.5 W/(m·K), thermal expansion of $20 \times 10^{-6}$/K), which are) made by Cool Polymers Inc.

In this case, in a preferable combination of materials of the frame member 12 and the cooling tube 14, thermal expansion of the materials is at the same degree between each other.

As an example, proposed is a combination of the cooling tube 14 made of copper (thermal expansion of $16.6 \times 10^{-6}$/K) or stainless steel (austenitic, thermal expansion of $13.6 \times 10^{-6}$/K) and the frame member 12 formed from the above-mentioned resin material having high thermal conductivity (thermal expansion of 10 to $20 \times 10^{-6}$/K).

Using the frame member 12 and the cooling tube 14 in a combination of materials thereof having thermal expansion at the same degree between each other allows a gap between the frame member 12 and the cooling tube 14 to be prevented from being formed due to a difference in thermal deformation in curing and constructing the frame member 12 or after forming the frame member 12, so that the thermal connection thereof is stably maintained.

Figure 32:
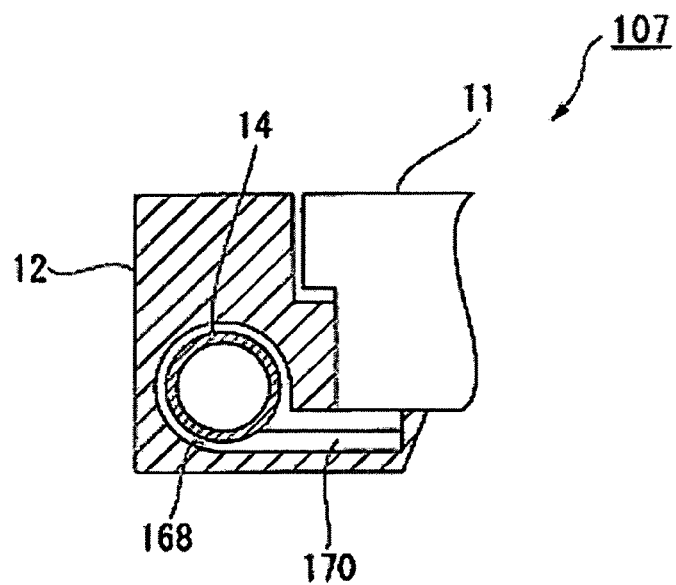
FIG. 32 illustrates a modification of the device holding frame in FIG. 30.

FIG. 32 illustrates a modification of the device holding frame 106 in FIG. 30.

In a device holding frame 107 in FIG. 32, one frame member 12 is formed on the periphery of the cooling tube 14 in insert molding process, similarly to the device holding frame 106 in FIG. 30. The device holding frame 107 is different from the device holding frame 106 in FIG. 14 in that it comprises a heat transferring member 170 for thermally connecting the optical device 11 and the cooling tube 14 other than the frame member 12.

That is to say, the heat transferring member 170 formed from a material having high thermal conductivity is provided in the frame member 12 in addition to the cooling tube 14, as shown in FIG. 32. A part of the heat transferring member 170 is in contact with the cooling tube 14 in the frame member 12 while another part of the heat transferring member 170 is exposed outside to be in contact with the optical device 11. In the embodiment, the heat transferring member 170 is formed from a plate member and provided along and substantially around the outer surface of the cooling tube 14 and the end of the heat transferring member 170 contacts with the optical device 11.

For the heat transferring member 170, preferably used is a thermal conductor formed from a material having high thermal conductivity, that is, various kinds of metal such as aluminum (234 W/(m·K)), magnesium (156 W/(m·K)) or an alloy of the above (an aluminum die casting alloy (about 100 W/(m·K)), an Mg—Al—Zn alloy (about 50 W/(m·K)) or the like), for example. The frame 12 is not limited to be formed from a metal material but may be formed from another material (such as a resin material) having high thermal conductivity (5 W/(m·K) or more, for example).

In the embodiment, the optical device 11 is thermally connected to the cooling tube 14 by means of the heat transferring member 170 other than the frame member 12. Accordingly, the frame member 12 may be formed from a material having comparatively low thermal conductivity. For example, forming the frame member 12 from a resin material, which is comparatively low in thermal transfer, allows a cost to be reduced and a weight to be decreased.

Figure 33:
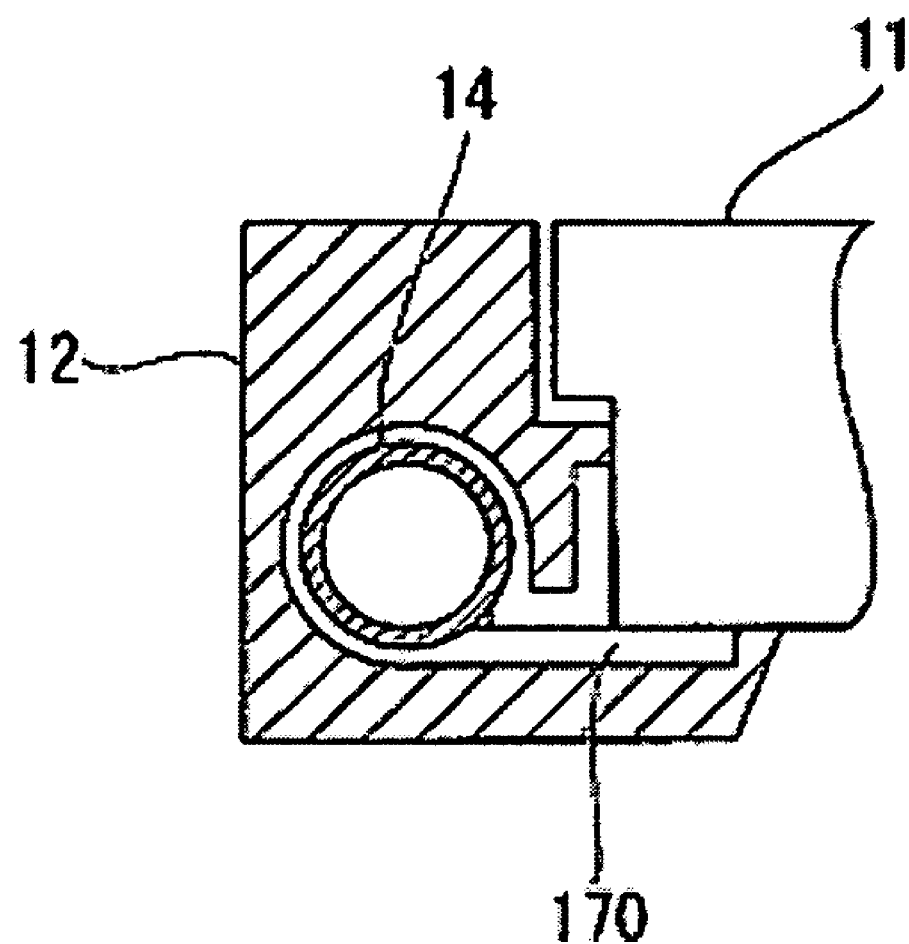
FIG. 33 illustrates a modification of the device holding frame in FIG. 32.

The heat transferring member 170 is not limited to one shown in FIG. 32. The shape and number of the heat transferring member 170 can be optionally set. For example, an end of the heat transferring member 170 formed from a plate member may be partially bent so as to correspond to the shape of a corner of the optical device 11, as shown in FIG. 33, for the purpose of enlarging the area for transferring heat.

In the above embodiments, described has been a case of a projector using three liquid crystal panels. The invention, however, can be applied to a projector only using one liquid crystal panel, a projector only using two liquid crystal panels and a projector using four or more liquid crystal panels.

The liquid crystal panel is not limited to a transmission type but a reflection type liquid crystal panel may be used.

Further, the optical modulation device is not limited to the liquid crystal panel. An optical modulation device such as a device using a micro mirror may be used other than the liquid crystal panel. In this case, the polarizing plates on the incident side and the exit side of the luminous flux can be omitted.

The invention can be applied to a front type projector in which projection is carried out in the direction of observing a screen and a rear type projector in which projection is carried out in the direction opposite to that of observing a screen.

Preferred embodiments of the invention have been described hereinbefore, made reference to drawings. It goes without saying that the invention, however, is not limited to the embodiments. It is obvious that a person skilled in the art can make various kinds of modification and correction within a range of the technical conception described in Claims. The modification and correction are naturally considered to be within a technical range of the invention.

The entire disclosure of Japanese Patent Application No: 2005-055628, filed Mar. 1, 2005 is expressly incorporated by reference herein.

What is claimed is:

1. A projector comprising:
   a light source unit;
   an optical apparatus including,
      an optical device,
      a holding frame for holding a periphery of the optical device, and
      a cooling tube, which is provided in the holding frame along the periphery of the optical device and in which a cooling fluid flows, wherein
      the holding frame has a structure that a pair of frame members is oppositely provided so as to sandwich the cooling tube therebetween,
      a groove for housing the cooling tube is formed on each opposing surface of the pair of frame members, and
      the cooling tube is provided on a first member of the pair of frame members while a second frame member is formed by molding around the cooling tube from a material having a melting point lower than that of the cooling tube;
   a cooling unit for circulating the cooling fluid in the optical apparatus; and
   a projection optical apparatus for enlarging and projecting an optical image formed by means of the optical apparatus.

2. The projector according to claim 1, further comprising:
   a connection part for connecting the first frame member and the second frame member in molding the second frame member.

3. The projector according to claim 1, wherein
   the first frame member is formed from a metal material or a resin material and the second frame member is formed from a resin member.

4. The projector according to claim 1, wherein
   the first frame member is formed with an auxiliary groove communicating with the gap for at least temporally housing the thermally conductive material.

5. The projector according to claim 4, wherein
   the cooling tube is formed from a metal material and the frame member is formed from a resin material having high thermal conductivity.

6. The projector according to claim 5, wherein
   thermal expansion is at the same degree between the cooling tube and the frame member.

7. The projector according to claim 5, wherein
   the resin material includes at least one of a resin material in which a metal material is mixed and a resin material in which a carbon material is mixed.

8. The projector according to claim 1, wherein
   the optical device including an optical modulation device for modulating luminous flux from a light source in accordance with image information, and/or a polarizing plate on at least one of an incident surface side and an exit surface side of the optical modulation device.

9. A projector comprising:
   a light source unit;
   an optical apparatus including,
      an optical device,
      a holding frame for holding a periphery of the optical device, and
      a cooling tube that is provided in the holding frame along the periphery of the optical device and in which a cooling fluid flows, wherein
      the frame member is formed by molding around the cooling tube from a material having a melting point lower than that of the cooling tube;
   a cooling unit for circulating the cooling fluid in the optical apparatus; and
   a projection optical apparatus for enlarging and projecting an optical image formed by means of the optical apparatus.

10. The projector according to claim 9, wherein
    both of the cooling tube and the holding frame are formed from a metal material.

11. The projector according to claim 10, wherein
    thermal expansion of the holding frame is higher than that of the cooling tube.

12. The projector according to claim 10, wherein
    the cooling tube is formed from a copper alloy and the holding frame is formed from an aluminum alloy or a magnesium alloy.

13. The projector according to claim 9, wherein
    the optical device including an optical modulation device for modulating luminous flux from a light source in accordance with image information, and/or a polarizing plate on at least one of an incident surface side and an exit surface side of the optical modulation device.

* * * * *